US008522208B2

(12) United States Patent
Dorn et al.

(10) Patent No.: US 8,522,208 B2
(45) Date of Patent: Aug. 27, 2013

(54) SYSTEM FOR CREATING AND RUNNING A SOFTWARE APPLICATION FOR MEDICAL IMAGING

(75) Inventors: Karlheinz Dorn, Kalchreuth (DE); Andrew John Hewett, Erlangen (DE); Detlef Becker, Möhrendorf (DE); Christian Spitzner, Sennfeld (DE); Antonius Ax, Effeltrich (DE); Norbert Dürbeck, Heideck (DE); Frank Hirschbeck, Erlangen (DE); Dieter Krotz, Erlangen (DE); Armin Michel, Erlangen (DE); Artur Pusztai, Erlangen (DE); Subrata Sinha, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 1348 days.

(21) Appl. No.: 11/903,159

(22) Filed: Sep. 20, 2007

(65) Prior Publication Data
US 2008/0082966 A1    Apr. 3, 2008

Related U.S. Application Data

(60) Provisional application No. 60/848,544, filed on Sep. 29, 2006.

(51) Int. Cl.
*G06F 9/44* (2006.01)
*G06K 9/00* (2006.01)

(52) U.S. Cl.
USPC .......................................... 717/122; 382/128

(58) Field of Classification Search
None
See application file for complete search history.

(56) References Cited

U.S. PATENT DOCUMENTS

| 4,558,413 | A | * | 12/1985 | Schmidt et al. | 717/170 |
| 5,668,998 | A | | 9/1997 | Mason et al. | |
| 5,832,269 | A | * | 11/1998 | Dollinger et al. | 717/107 |
| 6,157,194 | A | * | 12/2000 | Vassallo et al. | 324/322 |
| 6,263,330 | B1 | | 7/2001 | Bessette | |
| 6,678,703 | B2 | * | 1/2004 | Rothschild et al. | 382/132 |
| 6,707,469 | B1 | * | 3/2004 | Kelly | 715/744 |
| 2002/0019751 | A1 | * | 2/2002 | Rothschild et al. | 705/3 |
| 2002/0078262 | A1 | * | 6/2002 | Harrison et al. | 717/170 |
| 2003/0018955 | A1 | | 1/2003 | Hayase et al. | |
| 2003/0101291 | A1 | * | 5/2003 | Mussack et al. | 719/328 |

(Continued)

FOREIGN PATENT DOCUMENTS

| WO | 0225588 A2 | 3/2002 |
| WO | 03073830 A2 | 9/2003 |
| WO | WO 2006/057953 A2 | 6/2006 |

OTHER PUBLICATIONS

Dot. Net. Aus Wikipedia der freien Enzyklopädie, Sep. 23, 2006, im Internet <URL:: http://wikipedia.org/w/index.php?title=Dot net &printable=yes>, pp. 1-9.

*Primary Examiner* — Insun Kang
*Assistant Examiner* — Erika Kretzmer

(57) ABSTRACT

An effective and user-friendly system is disclosed for creating and running a software application for medical imaging, having at least one framework which has a service layer and a superordinate toolkit layer as an application programming interface, wherein functions of the toolkit layer and of the service layer are grouped in each case in a number of components which are arranged strictly hierarchically in such a way that any component can only ever be accessed from a superordinate component.

20 Claims, 11 Drawing Sheets

(56) References Cited

U.S. PATENT DOCUMENTS

| | | |
|---|---|---|
| 2003/0184811 A1 | 10/2003 | Overton |
| 2004/0252871 A1 | 12/2004 | Tecotzky et al. |
| 2005/0086642 A1 | 4/2005 | Runte et al. |
| 2005/0203771 A1* | 9/2005 | Achan .......................... 719/328 |
| 2006/0122865 A1 | 6/2006 | Preiss et al. |
| 2006/0168338 A1 | 7/2006 | Bruegl et al. |
| 2006/0195793 A1 | 8/2006 | Feihl et al. |
| 2007/0150855 A1* | 6/2007 | Jeong ........................... 717/106 |

\* cited by examiner

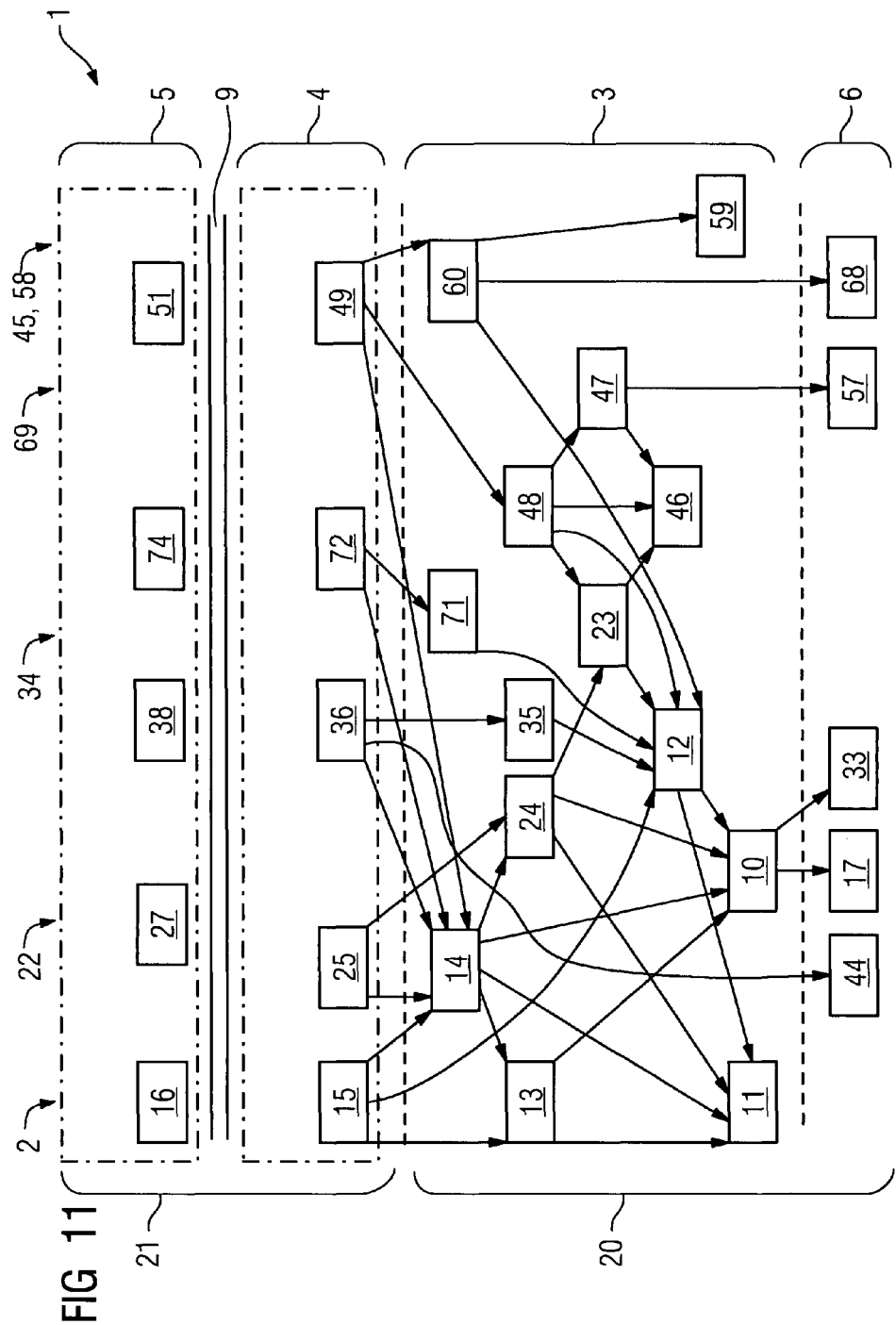

SYSTEM FOR CREATING AND RUNNING A SOFTWARE APPLICATION FOR MEDICAL IMAGING

CROSS REFERENCE TO RELATED APPLICATIONS

The present application claims the benefit of the provisional patent application filed on Sep. 29, 2006, and assigned application No. 60/848,544, and is incorporated by reference herein in its entirety.

FIELD OF THE INVENTION

The invention relates to a system for creating and running a software application for medical information processing, in particular in medical imaging.

BACKGROUND OF THE INVENTION

Software applications are used in the medical field, in particular in the field of (digital) medical imaging, for creating, modifying, archiving and transmitting between different nodes of a medical network medical data, such as, for example, digital examination images, patient data, results reports, etc. A medical network refers here to an ensemble of devices that are interconnected for data exchange for medical imaging purposes. The devices of such a medical network comprise in particular medical modalities, results computers, servers, databases and other data processing systems. In particular a medical network refers to a so-called DICOM network in which the devices (DICOM nodes) communicate with one another on the basis of the DICOM standard. In this context an image-generating medical examination device, in particular a computer tomograph, magnetic resonance tomograph, ultrasound scanner, etc., is referred to as a modality or image source.

A discrete functional/thematic field such as medical imaging—also referred to as "domain" in software development—requires specially adapted software solutions. Particularly in the domain of medical imaging, owing to the size of current medical equipment, the variety of tasks to be performed and the increasing electronic internetworking of different medical subfields, the domain-specific software applications designed for this purpose are highly complex and are becoming increasingly more so.

The creation of such a software application requires a high level of programming knowledge and experience from a developer. To date software applications for the medical imaging domain have been almost exclusively monolithic, that is to say have been created as one application block. In the event of changes being required, for a software update for example, such an application block must always be changed in its entirety. As a consequence, a huge amount of work is required for the creation of the application and its maintenance, which consequently hinders its timely further development. Moreover, a monolithic software application is usually relatively prone to error.

On the one hand software applications for medical imaging usually have a complex software architecture with several layers. On the other hand, the functions and services of such a software application are divided into a number of functional subgroups, referred to as subdomains below. Of prime importance for the medical imaging field in particular are the subdomains of data management, (data) transfer, worklist management, image processing, volume processing, reporting and image capture or examination.

The subdomain of "data management" comprises all the functionality of a congeneric software application relating to data access, in particular fundamental functions such as reading data from a file system, writing data into such a file system, and deleting stored data as well as creating files. The "file system" refers here to a structure in which data is stored in the form of files and which forms an ordering and access system for this data. A file system may correspond here to a physical storage medium, for example a hard disk, CD-ROM, etc., or it may be designed as a purely logical structure, for example as a virtual drive. The term data management furthermore comprises functionality built on top of this, in particular functions for searching and identifying specific data, access controls to the stored data, and local caching of data. Owing to the special nature of the data processed in the medical imaging field, in particular medical image data which is characterized by a very high memory requirement and close content links between image information and the associated textual information, so-called metadata, the data management employed in the medical imaging field is also subject to domain-specific requirements. Since the data in modern medical imaging is usually processed by a multiplicity of users at a large number of nodes of a computer network, effective data management is crucially important in this field in order to ensure the reliable and effective functioning of a software application designed for this field. The term data management is abbreviated to "DM" below.

The subdomain of (data) "transfer" (abbreviated to "TF" below) comprises all the functionality of a congeneric software application designed for the transmission of data, in particular medical image, volume, text and workflow data, between two devices or file systems of a medical network, for example in the context of the DICOM standard.

The subdomain of "worklist (management)" (abbreviated to "WL" below) comprises all the functionality of a congeneric software application designed for the creation and control of so-called worklists. In particular, such worklists are used in the medical imaging field for assigning steps of a medical workflow organized in a shared manner to the individual nodes of the medical network and for the automated coordination of the execution of the workflow. Such worklists are standardized in particular in the DICOM standard for the medical imaging field.

The subdomain of "image processing" (abbreviated to "IP" below) comprises all the functionality of a congeneric software application designed for modifying and displaying (two-dimensional) medical image data, comprising for example contrast and brightness operations as well as other color change operations, smoothing, sharpening or other filters, 2D pattern recognition (segmenting), etc.

The subdomain of "volume processing" (abbreviated to "VOL" below) covers all the functionality of a congeneric software application designed for creating multi-dimensional structures (3D/4D/ . . . scenes) on the basis of medical image data as well as handling, processing and displaying such structures or their two-dimensional steps and projections. Volume processing comprises in particular the visual/spatial representation of three-dimensional structures (volume rendering), 3D animation, and the generation of sectional images etc. In the text below "volume data" refers to data that contains image or structure information depending on a coordinate system having more than two dimensions. In contrast, "image data" is used to refer only to data containing two-dimensional image or structure information. In addition to customary images, image data here also refers in the wider sense to other data of a two-dimensional nature, in particular measurement curves such as so-called waveforms or spectral data for example. The distinction between image data and volume data is important insofar as, in contrast to volume data, image data can be represented directly on a screen or printout, and consequently is subject to quite different requirements in relation to the respective data processing.

The subdomain of "reporting" (abbreviated to "REP" below) comprises all the functionality of a congeneric software application that supports the creation of medical reports, in particular results reports and presentations, in particular using structured data (e.g. according to the DICOM or HL7 standard).

Finally, the subdomain of "image capture" or "examination" (abbreviated to "EXAM" below) comprises all the functionality of a congeneric software application designed for creating medical image data, that is to say for generating images of examination results on the image-generating modality, including real-time (live) display of the image data captured as well as other services that support image recording.

In conventional applications for the medical imaging domain, the components of an application layer usually depend in a complex manner both on components in the same layer and on components of other layers, with in particular frequently different subdomains being linked permanently to one another as a result of such dependencies. This hinders the further development of software applications, particularly since the mesh of interdependencies means that a change in one component usually results in a cascade of changes. The further development of such a software application is also highly prone to error, particularly since any dependency overlooked on making a change can greatly impair the stability of the software application.

To simplify application development, so-called frameworks exist as support environments for an application developer. A framework often encapsulates the individual layers of a software application within a generic runtime environment and consequently enables the application to be executed independently of the platform and/or the location of execution.

One important framework is the .NET framework from Microsoft Corporation. This framework enables a wide variety of programming languages such as C#, Visual Basic.NET, C++/CLI or JScript.NET to be used as the basis for programming an n-layered application. Irrespective of the type of programming language used, the application and/or respective architecture layer of the application is converted into an "intermediate language" ("Common Intermediate Language" (abbreviated CIL), previously also known as "Microsoft Intermediate Language" (abbreviated MSIL)).

The application programming interfaces (abbreviated to API) that are required between the individual layers of the application are very important here. A distinction is drawn between function-oriented, interface-oriented and protocol-oriented application programming interfaces. In contrast to function-oriented and interface-oriented application programming interfaces, protocol-oriented application programming interfaces are not dependent on the operating system of the platform and the type of application layers to be connected.

SUMMARY OF THE INVENTION

Against this background, the object of the invention is to disclose a system for creating and running a software application suitable for use in the domain of medical imaging, which enables an application to be created simply and enables such an application to be run effectively.

According to the invention, this object is achieved by the features of the claims.

Accordingly at least one subdomain-specific framework is provided within the system. The or each framework comprises at least two layers, namely a service layer and a superordinate toolkit layer. The toolkit layer forms an API here and thus provides tools with which an application developer can more easily access the functionality of the service layer for the purposes of rapid application development (RAD). The toolkit layer thus represents the "visible interface" of the system for the application developer. The components or software modules and functions of the service layer itself can on the other hand remain "hidden" to an application developer. The application developer therefore need not access the latter components and functions directly (however, direct access of an application to components and functions of the service layer can nevertheless be permitted as an option).

In addition to the actual service layer, a web service layer which is in turn subordinate to the service layer can be optionally provided. In this case the functionality of the system that can be invoked from a remote node of a medical network, in particular central services that are shared by the entire network or parts of it, are shifted out into the web service layer. In this embodiment of the system, the service layer is designed in such a way that it can also run without the services of the web service layer, and in this case accesses only locally executable functionality. The strict separation of the service layer and the web service layer thus enables in a simple manner one and the same version of the system to run both in online mode (i.e. as part of the medical network) and in offline mode (i.e. on a stand-alone computer).

The components of the web service layer nevertheless share the fundamental characteristics of the service components. The following general descriptions of components of the service layer therefore also apply to components of the web service layer.

For the purposes of the above and following descriptions, the term "function" will be used generally to refer to a software module that performs a specific functionality. The term is used however independently of the actual programming implementation of this "function". It thus encompasses in particular functions as defined in classic procedural programming, objects within object-oriented programming, plug-ins, assemblies etc.

The terms "component" and "(software) module" are used synonymously in the above and following descriptions to refer to a combined group of functions in accordance with the above definition. They can refer to an autonomously executable program or subroutine, or to a collection of functions that are not per se independently executable. The term component or module therefore encompasses in particular function and class libraries as well as collections of plug-ins and/or assemblies or the like.

Components of the service layer will be referred to below as service components, and components of the toolkit layer will be referred to as toolkits.

With respect to their respective superordinate/subordinate hierarchy, the components of the service layer and of the toolkit layer are arranged strictly hierarchically both within the layers and across the layers. In this case the defining characteristic of this hierarchy is that any component can only ever have access to hierarchically subordinate components. In other words, a component is dependent only on subordinate components. Conversely, no component contains information about another component that is coordinate with or superordinate to it. The hierarchical order of the components goes hand in hand with an increasing degree of abstraction and an increasing standardization of the functions contained in the respective components. Low-ranking components thus contain comparatively fundamental functions, while higher-ranking components accordingly contain functions with a higher degree of abstraction which access the functions of the lower-ranking components as necessary.

The strictly hierarchical order of the components greatly simplifies the further development of the framework(s). The hierarchy namely ensures that a change to any first component necessitates further changes only in the particular components that are superordinate to said first component in the chain of hierarchy. Components that are coordinate with or subordinate to said first component, on the other hand, are perforce unaffected by the change. By virtue of the hierarchical ordering of components, the software architecture is also greatly simplified, and consequently the system is significantly less prone to error.

In a preferred embodiment of the invention, the service components of toolkits differ fundamentally with respect to their programming and execution characteristics.

Accordingly, the service components are designed to be single-instantiated and multi-threaded, whereas toolkits are designed to be multi-instantiated and single-threaded.

"Single-instantiated" refers to a component or function when it can be used as part of an application solely in a single instance. In contrast, a component or function that is designed to be "multi-instantiated" can be used within the application in the form of multiple instances (of the same software version or different software versions) provided several times over.

A "thread" refers to an execution template or execution thread, according to which the instruction sequences of a computer program are executed sequentially. In the case of a component or function that is "single-threaded", only one such thread exists at any one time. Multiple pending tasks are always processed sequentially by such a component or function. In the case of a "multi-threaded" component or function, on the other hand, several threads can be simultaneously executed independently of one another.

As is known, a multi-threaded component is much more performant than a single-threaded component, because it always fully utilizes the computing power of the available hardware, in particular all the processors present. On the other hand, however, programming multi-threaded processes is much more difficult and prone to error than single-thread programming.

By designing the service components and toolkits differently as described above, the respective advantages of the described programming variants are synergistically exploited. For instance, an application developer usually only comes into direct contact with the toolkits and consequently can enjoy the easier handling of single-thread programming. The multi-instantiability of these components is expedient here in particular for providing complex applications with sufficient linking points to the functions of the framework.

The service components on the other hand cannot usually be accessed directly by the application developer, so that the comparatively difficult handling of these components as a result of their multi-thread capability does not represent a disadvantage during application development. In turn the multi-thread capability of the service components—to which a high proportion of the actual computing power is devoted during execution of the application—ensures a high performance of the application. At the same time, the single-instantiability of the service components means that a comparatively simple structure of the software architecture in the service layer is achieved.

For the purposes of rapid application development (RAD), it is expediently provided that toolkits can be instantiated in a visual programming environment and can be linked using methods and events.

For structured, and consequently further simplified, application programming, the programming environment can advantageously be structured in a plurality of pages on which the toolkits can be instantiated and linked. In a preferred embodiment, a so-called master page can be created here for the or for each framework, which page represents a template or a frame for the framework-specific functionality of an application. The or each framework has here one or more toolkits which can be assigned to said master page and which consequently determine the characteristics of said master page. In addition, it is optionally possible to provide for one or more frameworks the ability to design and/or extend the functionality frame given by the master page by means of multiple interchangeable contents. Using the master page as a template, it is possible to create a plurality of content pages for this purpose. Further toolkits (referred to below as "toolbox modules") can be created within the respective framework, to each of which a content page can be assigned and which specify the actual content of this page.

The system preferably comprises a presentation layer that corresponds with the toolkit layer. The presentation layer provides a (in particular graphical) user interface, that is to say contains functions for displaying data and for issuing control commands. Within the presentation layer, a corresponding presentation page is provided for each page of the toolkit layer. As a rule (but not necessarily), a corresponding presentation component is also provided for each toolkit. The or each presentation page corresponds with the corresponding page of the toolkit layer. The corresponding pages of the toolkit layer and presentation layer thus interact as the backend and frontend of a user interface of an application in order to transmit control commands of a user to the service layer and, in the other direction, display outputs of the service layer for the user. The toolkit layer and the presentation layer expediently correspond with each other here via an interconnection interface that can be configured flexibly for different deployments, that is to say distributions of the presentation layer and toolkit layer to one or more nodes of the medical network.

Again for the purposes of rapid application development, provided within the presentation layer is a visual programming environment in which the or each presentation component can be instantiated and can be linked using methods and events.

In order to adapt the or each framework flexibly to the requirements of the specific application, and extend it if necessary, the functions of the service components, as well as optionally also of the toolkits and presentation components, are preferably implemented entirely or at least partially in the form of plug-ins. The plug-ins are expediently implemented in such a way that they can be linked in or deactivated at the runtime of the application built on the framework.

Irrespective of the layer structure introduced above—that is to say the service layer and the toolkit layer as well as, if present, the web service layer and/or the presentation layer—a so-called stability layer and a so-called development layer are defined with respect to the or each framework, wherein the stability layer occupies a hierarchically subordinate area of the software architecture and the development layer occupies a contiguous hierarchically superordinate area of the software architecture. In other words, each component of the service layer, toolkit layer, presentation layer or web service layer is also assigned to either the stability layer or to the development layer depending on its hierarchical position within the software architecture.

The defining characteristic of the stability layer is that the components belonging to this layer are versioned so as to be strictly backwards-compatible. This means that—apart from rectifying any programming errors—changes to one of these components can only be made to the extent that their previous functionality remains unaffected. In other words, modules in the stability layer can only be extended, they cannot be changed. In contrast, the defining characteristic of the development layer is that the modules in it can be versioned without having to be backwards-compatible, i.e. they can be developed further. By virtue of this differentiated versioning concept, it is firstly ensured as a result of the stability layer that the applications built on the framework will be stable in the long term, even if differently versioned modules are used within the framework or if a subdomain-specific framework is used in conjunction with newer or older framework versions of other subdomains during application development.

By virtue of the development layer, at the same time a flexible adaptability of the framework is achieved in the application-oriented area of the framework architecture.

In principle the boundary between the stability layer and the development layer can be selected independently of the respective boundaries of the web service, service, toolkit or presentation layer. The boundary between the stability layer and the development layer is however preferably selected so that it is coincident with the boundary between the service layer and the toolkit layer. In this embodiment, therefore, the service components as well as—if present—components of the web service layer belong to the stability layer, whereas toolkits and—if present—components of the presentation layer belong to the development layer.

A particularly flexible deployment capability of the system described above is achieved in particular if the modules of the or each framework are designed in such a way that they are encapsulated in layers and can be executed platform-independently in a generic runtime environment.

In an expedient embodiment, a separate framework is provided in each case for at least one subdomain, but preferably for each of the subdomains set out above. The system according to the invention thus preferably comprises in any selection or combination
  a data management (DM) framework,
  a transfer (TF) framework,
  a worklist (WL) framework,
  an image processing (IP) framework,
  a volume processing (VOL) framework,
  a reporting (REP) framework, and/or
  an image capture (EXAM) framework.

The system further comprises an infrastructure framework which provides general functionality, described in greater detail below.

The or each framework can be used independently here or if necessary can be combined freely with frameworks of other subdomains. The ability to freely combine the frameworks, especially the inclusion of the image capture framework in the framework pool, opens up the opportunity to combine, in addition to systems for results, also systems for examination, i.e. image-generating modalities, or integrated examination and results systems. In addition, such systems can also be directly interconnected. For instance, a modality can be connected to an image processing application server. These application options go significantly beyond the functionality provided by conventional medical networks, in particular beyond pure DICOM connectivity.

In principle the individual frameworks can be constructed completely independently of one another. For the purposes of rational creation and further development, however, identical components are preferably provided within the various frameworks for the same or similar functionality. If several such overlapping frameworks are used in combination, then the use of these multiple components is expediently shared by the respective frameworks. In the case of components of the service layer and web service layer, the use of one and the same instance is preferably shared by the respective frameworks.

In a preferred embodiment, the or each framework comprises a core of service components that can be autonomously executed in offline mode as well as an assigned web service component that provides corresponding services of remote network nodes in online mode. Thus remote data management services are assigned to the data management framework within the web service layer, corresponding remote transfer services are assigned to the transfer framework, etc.

For the subdomains mentioned in the introduction, the component arrangements described below have proved to be particularly advantageous with respect to providing as simple and effective a software architecture as possible, a particularly high re-usability of individual components within various frameworks, and a good and flexible way of combining the various frameworks. For the sake of better clarity, for components that are shared by a plurality of frameworks the functionality, the hierarchical order with respect to already introduced components, and the dependency of subordinate components will only be described in detail the first time they are named. Unless explicitly specified otherwise, said components exhibit their specific characteristics in the same way within all respective frameworks.

Data Management (DM) Framework:

The DM framework comprises as service components a file access module and a data management (DM) service module.

The file access module contains fundamental functions, that is to say in particular hardware-oriented functions for reading, writing and deleting data from/to a file system as well as for creating files. The file access module is preferably designed here to address a variety of different storage media, in particular a local hard disk, external data store, USB stick, etc.

The DM service module contains functions for data selection as well as for file access control. The term data selection encompasses here both the selection of individual data contents from the group of a file and functions for selecting files according to given search criteria.

The term file access control encompasses in particular the granting and control of user-specific usage rights for files or individual file contents for the purposes of data security as well as the granting and control of use-specific usage rights for files or file contents (data locking).

Within the service layer, the DM service module is superordinate here to the file access module, wherein the file access module can be accessed from the DM service module.

As a toolkit, the DM framework comprises a data management (DM) basic module which, as part of an API, provides functions that enable an application built on the framework to access the functions of the DM service module.

In an advantageous further development of the invention, an information model mapping module is also provided in the service layer of the DM framework. Said service component contains functions that enable a unique reference to be assigned to logical data objects, and to assign said references a unique set of files, as well as to analyze and group such references. A "reference" is generally used to refer to data with which a data object can be uniquely identified or addressed, as well as characterized, on the basis of an underlying model. In particular such a reference may consist of a file name selected in accordance with the data standard, an identifying number or the like. In an expedient embodiment, the information model mapping module assigns the reference on the basis of the DICOM standard in the form of a so-called UID (unique identifier).

The information model mapping module is on the same hierarchical level as the file access module. Within the chain of hierarchy, the information model mapping module can be accessed from the DM service module.

In a further advantageous development of the invention, a workspace module is also provided in the service layer of the DM framework. Said workspace module contains functions that enable the platform-independent local caching of data.

The workspace module is superordinate to the file access module and—if present—to the information model mapping module and can access this module/these modules. The workspace module is in turn accessed directly from the DM basic module. The workspace module is expediently subordinate to the DM service module. However, there is preferably no access to the workspace module provided from the DM service module, in order to keep the DM service module and the workspace module independent of each other.

A service component is expediently arranged between the DM service module and the DM basic module; in the text below said service component is referred to as the standard data management (DM) access module. Said module contains functions that enable simplified, in particular combined, access to functions of the DM service module and of the file access module as well as of—if present—the information model mapping module. For example, frequently used operations that require a combined invocation of functions of the above-mentioned subordinate service components are implemented in the standard DM access module. The standard DM access module can in turn be accessed from the DM basic module.

As an assigned component of the web service layer, the DM framework preferably comprises remote DM services. In online mode said services enable access to data stored on a remote network node. The remote DM services are subordinate to the file access module and can be accessed from the latter.

In expedient embodiments of the invention, the DM service module comprises one or more of the subsystems of functions described below which are assigned to a variety of tasks in each case.

For instance, a first subsystem (indexing subsystem) of functions which enable files to be indexed according to metadata is preferably provided. In particular, the files stored locally in a cache are indexed in this case.

"Metadata" refers to data which is assigned to the stored files and which describe said files, in particular their content, in greater detail. The files processed in medical imaging, in particular digital image files, are usually provided with an extensive set of metadata containing, for example, information about the image-recording modality, the medical and technical aspects of an examination, the patient examined, etc. The metadata of medical imaging files is created in particular in compliance with the DICOM standard.

"Indexing" refers here to any type of index generation or cataloging of the files on the basis of the contents of their metadata. Said indexing can be performed according to any given or specifiable schema. For example, the locally stored image data of a particular examination type—e.g. CT scan—can be indexed according to the patient's age.

In addition or alternatively, the DM service module comprises a second subsystem of functions (query subsystem) which enables searching in the stored files. Said searching is performed on the basis of a comparison of the metadata assigned to the stored files with a given or specifiable search schema. For example, it is possible in this way to search for medical image data of a particular patient by the patient's name. Said search functions can be designed as an independent functionality. In this case, the metadata of the stored files is searched directly. For a simplified, and hence also faster, search, the functions of the query subsystem are alternatively designed to build on the above-described indexing of the files. The two variants—direct searching and indexed-based searching—can also be combined with one another.

Again in addition or alternatively, the DM service module comprises two further subsystems (synchronization subsystem and locking subsystem) of functions which serve to synchronize files and/or avoid multiple access to the same file. In relation to a file which is stored as multiple copies at different storage locations, "(file) synchronization" is understood to mean an automatic comparison mechanism which prevents the file contents of the copies becoming successively divergent as a result of changes to individual copies in each case. In particular, by means of the synchronization, changes that were made to a file locally and offline are automatically transferred to the copies stored at other locations of the medical network when online mode is resumed.

Closely associated with the issue of file synchronization is the avoidance of simultaneous multiple access to the same file in online mode. In particular, such functions are also referred to as "data locking". As part of data locking, in particular the write and delete rights of other users of a file are blocked as soon as and for as long as a user is working on this file. In order to effectively prevent parallel processing of files that are stored in various copies at different storage locations, the capability of making global, i.e. network-wide, reservations for a file is preferably provided. To ensure effective and conflict-free processing of a complex data object containing a plurality of individual files in a given hierarchical order, it is expediently provided that the locking subset can make reservations on specific hierarchical levels of the data object. Such a complex data object is in particular an electronic patient dossier which contains, for example in the hierarchical structure prescribed by DICOM, basic patient data, courses of treatment, examinations, images, results reports etc.; the locking subset can, for example, block access by anyone else to either the entire patient dossier or only a particular examination.

Again in addition or alternatively, the DM service module comprises a further subsystem of functions (security subsystem) which grants and controls user-specific usage rights for the stored files or special file contents of said files, in particular a file header. This prevents unauthorized access to or unauthorized manipulation of the stored files or file contents.

Finally, again in addition or alternatively, the DM service module comprises a further subsystem of functions (work flag subsystem) which serves to manage so-called work flags assigned to the stored files. Work flags define rules that control the automated data processing processes for the assigned files, e.g. auto-archiving, auto-transfer or auto-printing.

Transfer (TF) Framework:

In its basic structure, as a service component, in addition to the file access module already described in connection with the DM framework, the TF framework comprises a pipeline module and a transfer (TF) service module.

The pipeline module forms a channel or frame for the processing of image data as well as metadata assigned thereto. In an expedient embodiment, it specifies a number of (physical or logical) source devices and a number of (physical or logical) target devices for image data, as well as additionally a number of image-processing filters which can be applied between the source devices and the target devices individually or in any combination, and which modify the image data routed through the pipeline. Any image and volume processing filters, e.g. for brightness and contrast operations, color changes, smoothing, sharpening, rotation, stretching, compression, etc. can be assigned to the pipeline as filters. In addition, filters for metadata can also be assigned to the pipeline.

The TF service module contains functions for transmitting data between two file systems by accessing the file access module and/or the pipeline module.

As a component of the toolkit layer, the TF framework comprises a transfer (TF) basic module which, as part of an API, provides functions that enable an application built on the framework to access the functions of the TF service module. In this case the TF basic module can be assigned in particular to a master page of the programming environment of the toolkit layer.

As part of an advantageous extension, the TF framework optionally comprises as a further component of the service layer the information model mapping module, the workspace module and/or the standard DM access module.

Within the TF framework, the workspace module can be accessed here from the pipeline module. Within the TF framework, the functionality of the standard DM access module can be accessed from the TF basic module. For use within the TF framework, the standard DM access module contains functions for simplified, in particular combined, access to functions of the TF service module, of the file access module and/or of—if present—the information model mapping module.

Within the TF framework (as well as within the frameworks described hereafter) the optional ability is provided to create, as further components of the toolkit layer, one or more "toolbox modules" (referred to as transfer (TF) toolbox modules within the TF framework) which can be assigned in each case to a content page of the programming environment. This enables an application developer to extend the functionality of the respective framework when needed, by being able to access functionality of the service layer in a modular manner for this purpose. The toolbox modules are thus not included in the standard version of the respective framework and also do not have any predefined function content, but rather can be created as required and provided with the custom functionality desired.

As an assigned component of the web service layer, the TF framework comprises remote TF services that enable data transfer with remote network nodes. The remote TF services are subordinate to the file access module and can be accessed from the latter.

Interaction Between DM Framework and TF Framework

If the standard DM access module is employed in isolation either within the DM framework or the TF framework, only one framework-specific limited function frame of this module can be used in each case. In addition, however, the standard DM access module also preferably comprises functions for combined access to specific functions of the DM framework (in particular functions of the DM service module) and specific functions of the TF framework (in particular functions of the TF service module). To utilize said cross-framework access options, the DM framework and the TF framework are preferably used in combination as a functional unit, in which case both the DM basic module and the TF basic module access the standard DM access module.

The standard DM access module furthermore forms a versatile and practical interface via which the toolkits of other frameworks can also access the common functionality of the DM and TF frameworks in a simple manner.

Worklist (WL) Framework

In its basic structure, as components of the service layer, in addition to the file access module and the workspace module that accesses the latter, the WL framework comprises a worklist (WL) service module superordinate to the workspace module. The WL service module contains functions for linking data to worklist entries. For this purpose it is designed to access the workspace module.

As the component of the toolkit layer which can be assigned to, for example, a master page of the programming environment, the WL framework has a worklist (WL) basic module which, as part of the API, contains functions that enable an application built on the framework to access the functions of the WL service module.

Also provided within the WL framework is the optional ability to create, as further components of the toolkit layer, one or more worklist (WL) toolbox modules which can be custom-generated and which can be assigned in each case to a content page of the programming environment.

The WL framework also preferably has higher-ranking data management and/or data transfer functionality available to it. The WL basic module accesses said functionality via the standard DM access module. In this variant, owing to the dependencies of the standard DM access module, the WL framework also comprises the DM service module and/or the TF service module with the pipeline module which is in turn subordinate to the latter.

As a component of the web service layer, the WL framework further preferably comprises remote worklist (WL) services that contain functions for the network-wide coordination of worklists, e.g. as part of a so-called information system. In this case the remote WL services can be accessed directly from the WL basic module.

Image Processing (IP) Framework

In its basic structure, as components of the service layer, in addition to the pipeline module the IP framework comprises a segmenting module subordinate to the latter, a graphics/display module coordinate with the pipeline module, and an image processing (IP) service module superordinate to the graphics/display module.

The segmenting module comprises functions for segmenting medical image data. The graphics/display module contains functions for handling and displaying layered image segment contents, in particular for interactive image manipulation, e.g. for measuring image segments on the screen. Within the IP framework, the segmenting module can be accessed both from the pipeline module and from the graphics/display module.

The IP service module comprises functions for displaying medical image data. For this purpose, the functions of the IP service module can access functions of the pipeline module, of the graphics/display module and/or of the segmenting module.

As the component of the toolkit layer assigned to, for example, a master page of the associated programming interface, the IP framework comprises an image display basic module which, as part of the API of an application built on the framework, provides functions for accessing the IP service module.

Also provided within the IP framework is the optional ability to create, as further components of the toolkit layer, one or more IP toolbox modules which can be custom-generated and which can be assigned in each case to a content page of the programming environment.

As a component of the web service layer, the IP framework further preferably comprises remote display services that comprise functions for displaying layered image segment contents on a remote node of a medical network. The functions of the remote display services are accessed here from the graphics/display module.

In a preferred variant, for data management functionality the IP framework co-utilizes the fundamental components of the DM framework, namely the file access module and/or the information model mapping module. Said functionality is accessed indirectly from the pipeline module via the workspace module. The IP service module can also optionally access the latter directly. Furthermore the IP framework also has higher-ranking data management and/or data transfer functionality available to it, which the IP basic module accesses via the standard DM access module in an expedient embodiment. In said variants, owing to the dependencies of the standard DM access module, the IP framework also comprises the DM service module and/or the TF service module.

Volume Processing (VOL) Framework

In its basic structure, as components of the service layer, in addition to the file access module (as well as optionally the information model mapping module coordinate with it) and the workspace module that accesses the file access module, the segmenting module and the graphics/display module that accesses the latter, the VOL framework comprises a volume processing (VOL) service module that is superordinate to said graphics/display module.

The VOL service module contains functions for processing and displaying medical volume data by accessing the graphics/display module and/or the workspace module.

As the component of the toolkit layer that can be assigned to, for example, a master page of the programming environment, the VOL framework comprises an image display basic module which, as part of the API of an application built on the framework, provides functions for accessing the VOL service module.

Also provided within the VOL framework is the optional ability to create, as further components of the toolkit layer, one or more volume processing (VOL) toolbox modules which can be custom-generated and which can be assigned in each case to a content page of the programming environment.

Since volume data can also only be represented in the form of two-dimensional graphics—in particular three-dimensional views and/or sectional views—as is known the representation of volume data requires functionality virtually identical to that of the image processing subdomain. In order to create a particularly rational software architecture therefore, the components of the system oriented to displaying images are expediently jointly used by the IP framework and the VOL framework. For instance, in a preferred embodiment, in addition to the segmenting module and the graphics/display module, an identical toolkit for both frameworks is also provided with the image display basic module.

As a further component of the service layer, the VOL framework preferably comprises a 3D image synthesis module. The 3D image synthesis module contains functions for creating three-dimensional images on the basis of 3D scenes. Said functionality is usually also referred to as "volume rendering".

As components of the web service layer, the VOL framework optionally further comprises remote VOL services and also optionally remote display services. The former comprise functions for processing volume data on a remote node of a medical network. In this case the remote VOL services can be accessed from the VOL service module.

Furthermore the VOL framework also has higher-ranking data management and/or data transfer functionality available to it, which the VOL basic module accesses via the standard DM access module in an expedient embodiment. In said variants, owing to the dependencies of the standard DM access module, the VOL framework also comprises the DM service module and/or the TF service module.

Reporting (REP) Framework

As components of the service layer, in addition to the file access module and the workspace module that accesses the file access module, the REP framework comprises a reporting (REP) service module superordinate to said workspace module.

The REP service module contains functions for creating and automatically reading reports structured according to a data standard, in particular DICOM, by accessing the workspace module.

In a preferred embodiment, the REP service module additionally accesses a subordinate terminology module within the service layer which provides boilerplate texts on a local level for standardized reporting.

Subordinate to the terminology module is optionally a component of the web service layer which is referred to below as the central terminology service and which provides appropriate boilerplate texts network-wide in online mode.

As a component of the toolkit layer, the REP framework comprises a reporting (REP) basic module which, as part of the API, provides functions that enable an application built on the framework to access the REP service module.

Also provided within the REP framework is the optional ability to create, as further components of the toolkit layer, one or more reporting (REP) toolbox modules which can be custom-generated and which can be assigned in each case to a content page of the programming environment.

Furthermore the REP framework also has higher-ranking data management and/or data transfer functionality available to it, which the REP basic module accesses via the standard DM access module in an expedient embodiment. In said variants, owing to the dependencies of the standard DM access module, the REP framework also comprises the DM service module and/or the TF service module as well as the pipeline module.

Image Capture (EXAM) Framework

In its basic structure, as a component of the service layer, the EXAM framework comprises an image capture (EXAM) service module which contains functions for capturing raw data by accessing at least one medical image source as well as for editing said raw data to form medical image data and for the real-time (live) display and archiving of raw data and/or edited image data.

As a component of the toolkit layer, the EXAM framework comprises an image capture (EXAM) basic module which, as part of the API, provides functions that enable an application built on the framework to access the functionality of the EXAM service module.

In an advantageous extension, the EXAM framework comprises remote image capture (EXAM) services which comprise for the online mode functions for capturing raw data by accessing at least one medical image source and/or for editing said raw data on a remote node of a medical network. The remote EXAM services, which are arranged as a component of the web service layer, can be accessed here from the EXAM service module.

For fundamental data management and data transfer functions, the EXAM framework preferably co-utilizes the corresponding components of the DM and/or TF framework, namely the file access module and/or the information model mapping module. The EXAM service module comprises here functions that directly access the file access module and/or the information model mapping module. In addition, the EXAM service module optionally also comprises functions that access the functionality of the DM and/or TF framework on a higher level, namely via the workspace module. Optionally the EXAM basic module also has a further access option to the standard DM access module (again dependent on the DM and/or TF service module).

One essential task of the EXAM framework is to edit the raw data generated by the image sources (the nature of which is usually image data) for the purpose of archiving or for the purpose of real-time or live display using image-processing means. As is known, this requires similar functionality to that required within the IP framework. In a preferred variant, therefore, for the purposes stated the EXAM framework co-utilizes the corresponding service components of the IP framework, namely the segmenting module, the pipeline module, the graphics/display module (if necessary with their optionally subordinate remote display services), and the IP service module. In this case the IP service module is coordinate with or subordinate to the EXAM service module. The functions of the IP service module are preferably accessed directly from the EXAM basic module. The EXAM service module further contains functions that directly access the graphics/display module and/or the segmenting module.

For the real-time display of three-dimensional graphics, as is required for example in connection with a computer or MR tomograph as an image source for displaying examination data, the EXAM service module further expediently accesses the 3D image synthesis module of the VOL framework (which provides the corresponding functionality).

The EXAM service module preferably comprises an image source control subsystem of functions which enable communication with a number of defined image sources. The term communication refers here in particular to the sending and receiving of control commands and the respective responses, as well as further associated data. The image source control subsystem enables, for example, recording parameters to be sent to a specific image source, and in response thereto, the raw data accordingly recorded to be received, including the associated metadata.

In addition or alternatively, the EXAM service module comprises a raw data adaptation subsystem of functions which adapt the image-source-specific raw data formats, in particular with respect to the respective assigned metadata, to a common data standard, in particular DICOM.

Both subsystems are based on the finding that the image sources contained in a medical network usually comprise different device types from a number of manufacturers and different technology standards, in other words are extremely non-standardized. As is known, this non-standardization is also usually expressed in the fact that a different way of communicating with each image source is required, and in that the raw data output by the individual image sources is also individual, in particular with respect to the respective header formats.

The subsystems described above act as translators between the standardized control and display functions of the EXAM framework and the individual requirements of the individual image sources. In order to be able to integrate new image sources in the system in a simple manner, the functions of said subsystems are preferably designed as image-source-specific plug-ins, so that both subsystems can be adapted without any great installation effort, in particular without recompilation. This concept enables in particular the image source producer to supply the respective plug-ins together with the image source in the same way as a hardware driver.

As components of the service layer, the infrastructure framework comprises a user management or security module that contains functions for authentication and authorization of users as well as for audit trail handling, as well as functions oriented to user and role management; a configuration management module for all configuration purposes of an application; a license management module that contains functions for supporting the licensing of applications or their component functionality; an error management module that contains functions for supporting standardized error handling and error display; a trace management module that contains functions for supporting standardized trace handling, i.e. displays which function of a module has been run; a usage management module that contains functions for supporting standardized usage handling, i.e. indicates in what form the system or an application has been used.

As components of the web service layer, the infrastructure framework comprises infrastructure remote services which in online mode provide network-wide the corresponding functionality of user and security management, configuration management, license management, error management, trace handling, and usage management.

BRIEF DESCRIPTION OF THE DRAWINGS

Exemplary embodiments of the invention will be explained in greater detail below with reference to a drawing, in which:

FIG. 11 shows in a representation according to FIG. 2 a further embodiment of the system which contains the data management framework according to FIG. 2, the transfer management according to FIG. 3, the worklist framework according to FIG. 5, the image processing framework according to FIG. 6 and the volume processing framework according to FIG. 7 and the reporting framework according to FIG. 9 in combination.

Structures that correspond to one another are always denoted by the same reference numerals in all figures.

DETAILED DESCRIPTION OF THE INVENTION

FIGS. 2 to 11 show in various embodiments a system 1 for creating and running a software application for the domain of medical imaging, which system contains—depending on the particular embodiment—one subdomain-specific framework or a plurality of such frameworks in combination. All the frameworks described below are designed according to the same fundamental structural principles, in particular according to a common layer structure and a strictly hierarchical dependency principle. The frameworks described below overlap—more or less pronouncedly—with respect to some components. Unless explicitly stated otherwise, these components, which are always denoted the same in all the respective frameworks, are identical within each respective framework with respect to their functionality, their hierarchical order and their dependency on other shared components of the framework.

Figure 1:
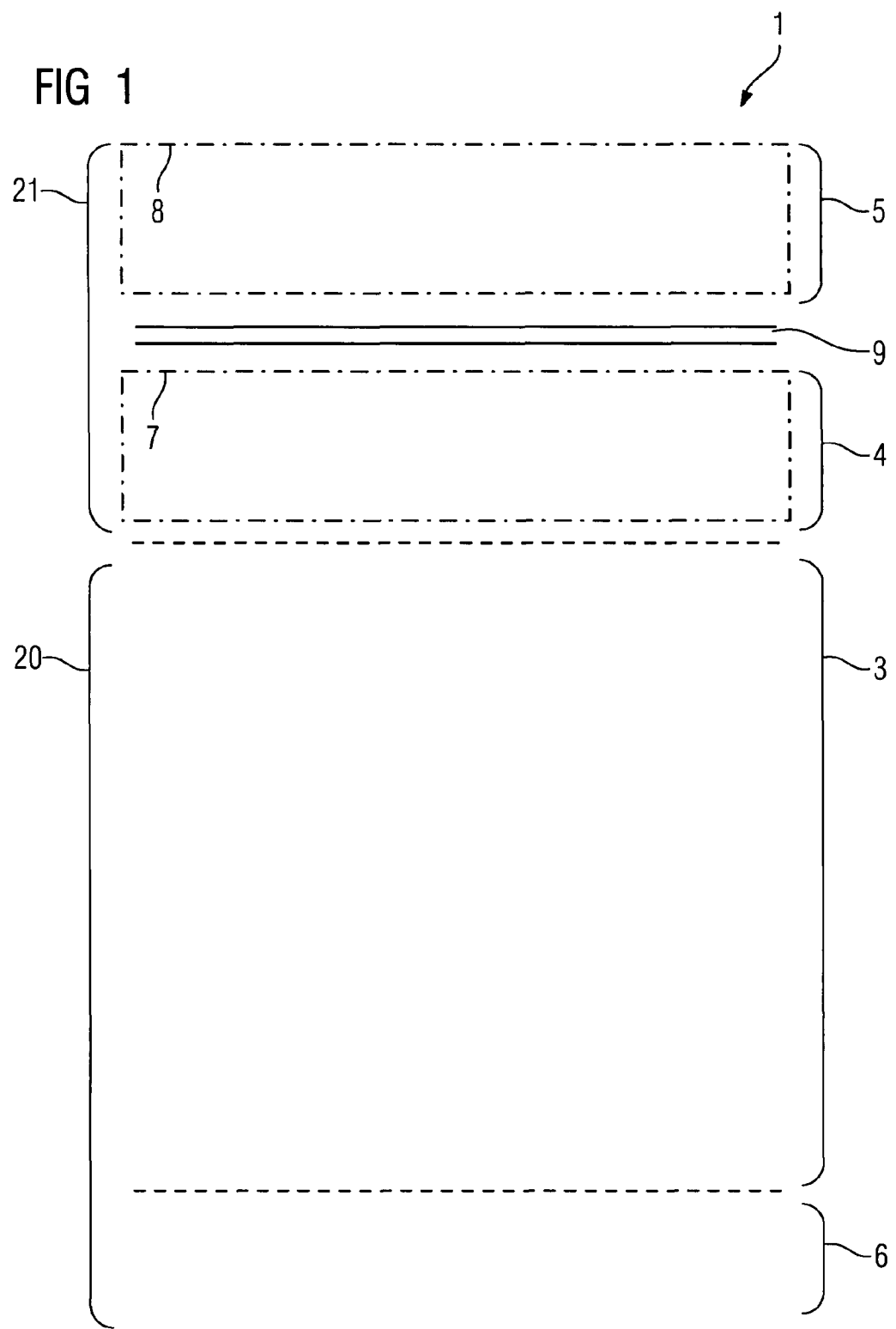
FIG. 1 shows in a schematic representation generally a layer structure of a system for creating and running a software application for information processing in the domain of medical imaging having at least one subdomain-specific framework.

The shared structural principles of the frameworks are described in greater detail below with reference to a schema represented in FIG. 1; said schema initially shows the layer arrangement on which all frameworks of the system 1 are based in an abstract form.

The (or each) framework comprises a plurality of software layers. The core area of the framework is formed here by a service layer 3 as well as a superordinate toolkit layer 4. The framework further comprises a presentation layer 5 as well as a web service layer 6 which is subordinate to the service layer 3.

For a software application building on the system 1, the presentation layer 5 forms the interface between the processes of the software application and a user. In particular it serves here to build a graphical user interface (also known as GUI).

The service layer 3 contains—generally speaking—"services" which the framework makes available to the software application. The toolkit layer 4 enables the software application to access said services. In particular as the backend corresponding with the presentation layer 5, in this case the toolkit layer 4 provides the IT-technical bridge between the presentation layer 5 and the service layer 3.

The toolkit layer 4 forms an API, and consequently the visible interface of the framework for an application developer, on which the actual software application can be built using the functions of the service layer 3 which are not normally directly accessible to the application developer. To enable rapid application development, the toolkit layer 4 provides a visual programming environment 7 in which components of the toolkit layer 4 can be graphically instantiated and linked or "wired" to one another using methods and events. The programming environment 7 is structured here in the form of pages. It provides here for the or each framework a master page on which a frame for the framework-specific characteristics of an application can be defined by means of appropriate linking of components of the toolkit layer 4. Said master page can be optionally used within a plurality of the frameworks described below as a template for creating so-called content pages which, in addition to the characteristics of the master page, have a different content in each case.

The presentation layer 5 correspondingly also provides a visual programming environment 8 on which the graphical user interface can be built, and which is structured in pages analogously to the programming environment 7.

Data is exchanged between the toolkit layer 4 and the presentation layer 5 via an interconnection interface 9. The interconnection interface 9 can be flexibly configured in such a way that the connection between toolkit layer 4 and presentation layer 5 can be automatically adapted to different deployments of said layers 4, 5 on one or more computers. The interconnection interface 9 thus enables the frontend and backend of a software application built on the system 1 to be used either on the same computer (as a so-called desktop application) or distributed among multiple computers (client/server structure) without requiring separate source code masters and/or a recompilation of the application for this purpose.

The functions made available by the framework are structured in a number of components which—as explained above—are also referred to as service components, presentation components, toolkits, etc. depending on the layer to which they belong.

With respect to the implementation of their programming and execution, the service components (including the components of the web service layer 6) differ fundamentally from the components of the toolkit layer 4 and of the presentation layer 5.

For instance, the service components are implemented as multi-threaded and single-instantiated, whereas the components of the toolkit layer 4 and presentation layer 5 are designed to be single-threaded and multi-instantiated. Reference is again made to the explanations above for the advantages of this layer-dependent opposite implementation of the service components and toolkits.

Each of the frameworks described below is fully functional for offline mode only with the components of the service layer 3 and toolkit layer 4, as well as furthermore the components of the presentation layer 5.

The web service layer 6 supports the online mode of a locally installed application as part of a medical network and enables access to services that are located remotely on other nodes of the network. The separation of service layer 3 and web service layer 6 enables in a simple manner the implementation of applications that are suitable both for online mode and offline mode, as well as for problem-free switching between the two operating modes at runtime.

In addition to the structuring of the (or each) framework in the layers 3 to 6, and irrespective of this, a stability layer 20 as well as development layer 21 are defined with respect to the framework. The stability layer 20 occupies here a hierarchically subordinate area, and the development layer 21 occupies the contiguous hierarchically superordinate area of the framework. In the exemplary embodiment represented, the boundary between the stability layer 20 and the development layer 21 is selected so that the stability layer 20 comprises exactly the service layer 3 and the web service layer 6, whereas the development layer 21 comprises the toolkit layer 4 and the presentation layer 5. In principle the boundary between the stability layer 20 and the development layer 21 can however also be selected independently of the layers 3 to 6. Since they belong to the stability layer 20, the modules of the service layer 3 and web service layer 6 are accordingly versioned so as to be strictly backwards-compatible. For the modules belonging to the development layer 21, on the other hand, there is no necessity for them to be versioned so as to be backwards-compatible, so that flexible further development of said components is possible.

Figure 2:
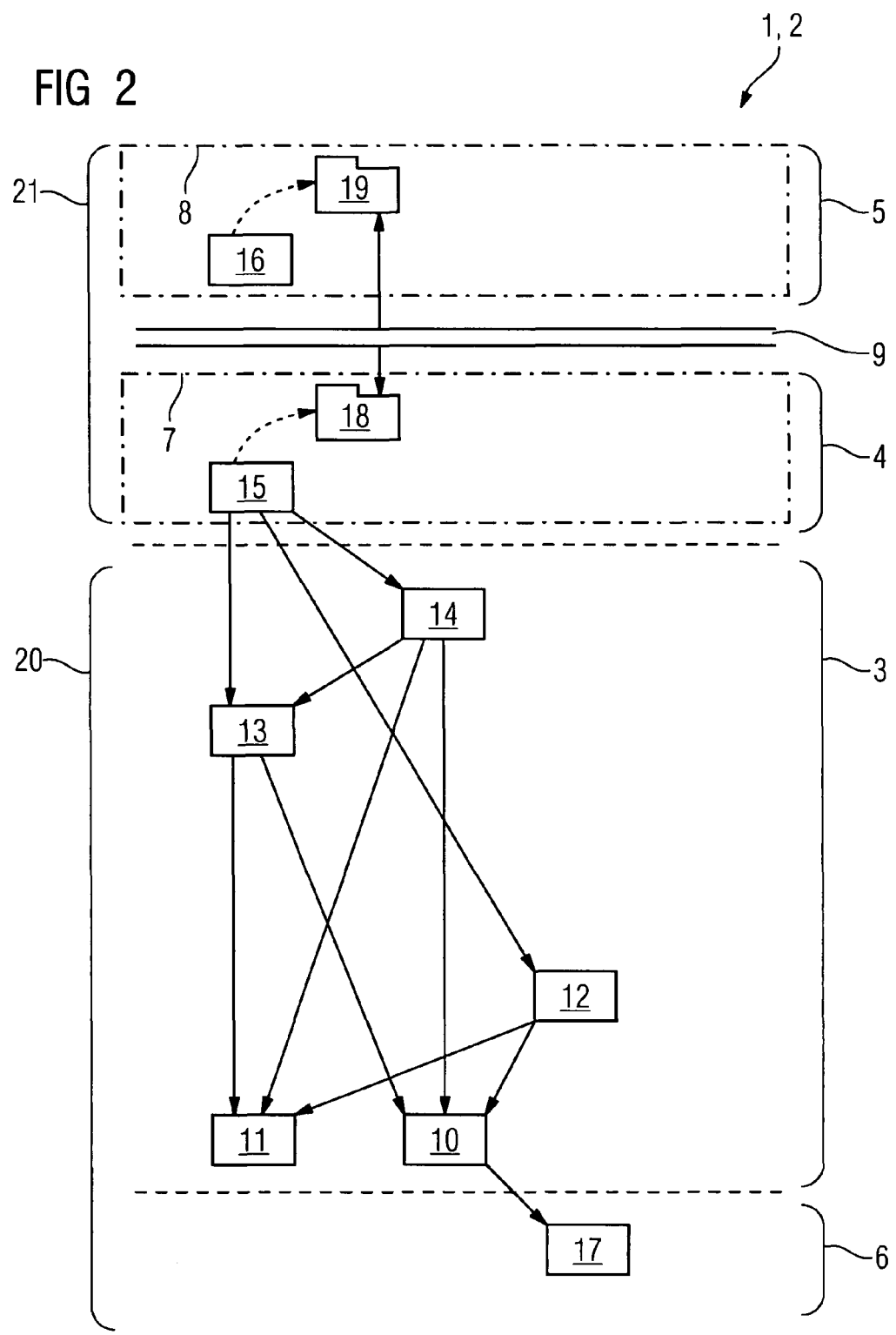
FIG. 2 shows in a schematic block diagram on the basis of the schema according to FIG. 1 a first embodiment of the system having a data management framework.

FIG. 2 shows a first embodiment in which the system 1 comprises a framework oriented to the subdomain of data management (DM for short). Said framework is referred to below as the DM framework 2.

In detail, according to FIG. 2, as service components the service layer 3 for the DM framework 2 comprises a file access module 10, an information model mapping module 11, a workspace module 12, a DM service module 13 as well as a standard DM access module 14.

In the toolkit layer 4 the DM framework 2 comprises a single toolkit, which is referred to below as the DM basic module 15. In the presentation layer 5, a presentation component, which is referred to as the DM presentation module 16, corresponds with the DM basic module 15 of the toolkit layer 4.

The DM basic module 15 can be instantiated within the programming environment 7 on a master page 18 assigned to the DM framework 2. The DM presentation module 16 can be instantiated on a master page 19 provided analogously within the programming environment 8. The master pages 18 and 19 exchange data with each other.

The DM framework 2 in the web service layer 6 furthermore contains a component referred to as remote DM services 17.

The components of the DM framework 2 have in each case the or all functions respectively cited in the description section preceding the description of the figures. In particular, however, the functions implemented in the DM service module 13 comprise the above-described subsystems, namely the indexing subsystem, the query subsystem, the synchronization subsystem, the data locking subsystem, the security subsystem and the work flag subsystem. The subsystems are implemented in the form of plug-ins and can be activated or deactivated at runtime of an application either individually or in any combination for execution within the application.

The components contained in the web service layer 6, the service layer 3 and the toolkit layer 4 are ordered strictly hierarchically with respect to one another; this is expressed in that each of the components can only ever access hierarchically subordinate components, whereas access from one of the components to a coordinate or superordinate component is precluded.

The dependencies provided between the components, i.e. the access options, are indicated schematically by arrows in FIG. 2. Accordingly, the remote DM services 17 located at the very bottom of the hierarchy are accessed from the directly superordinate file access module 10. Each of the modules 10 and 11 can be accessed from either the workspace module 12, the DM service module 13 or the standard DM access module 14. Within the service layer 3, the standard DM access module 14 is located at the very top of the hierarchy and is designed in turn to access the DM service module 13. No direct access option is provided between the DM service module 13 and the workspace module 12, or between the standard DM access module 14 and the workspace module 12 respectively.

Access is possible both to the standard DM access module 14 and to the DM service module 13 as well as to the workspace module 12 via the DM basic module 15 arranged in the toolkit layer 4.

Figure 3:
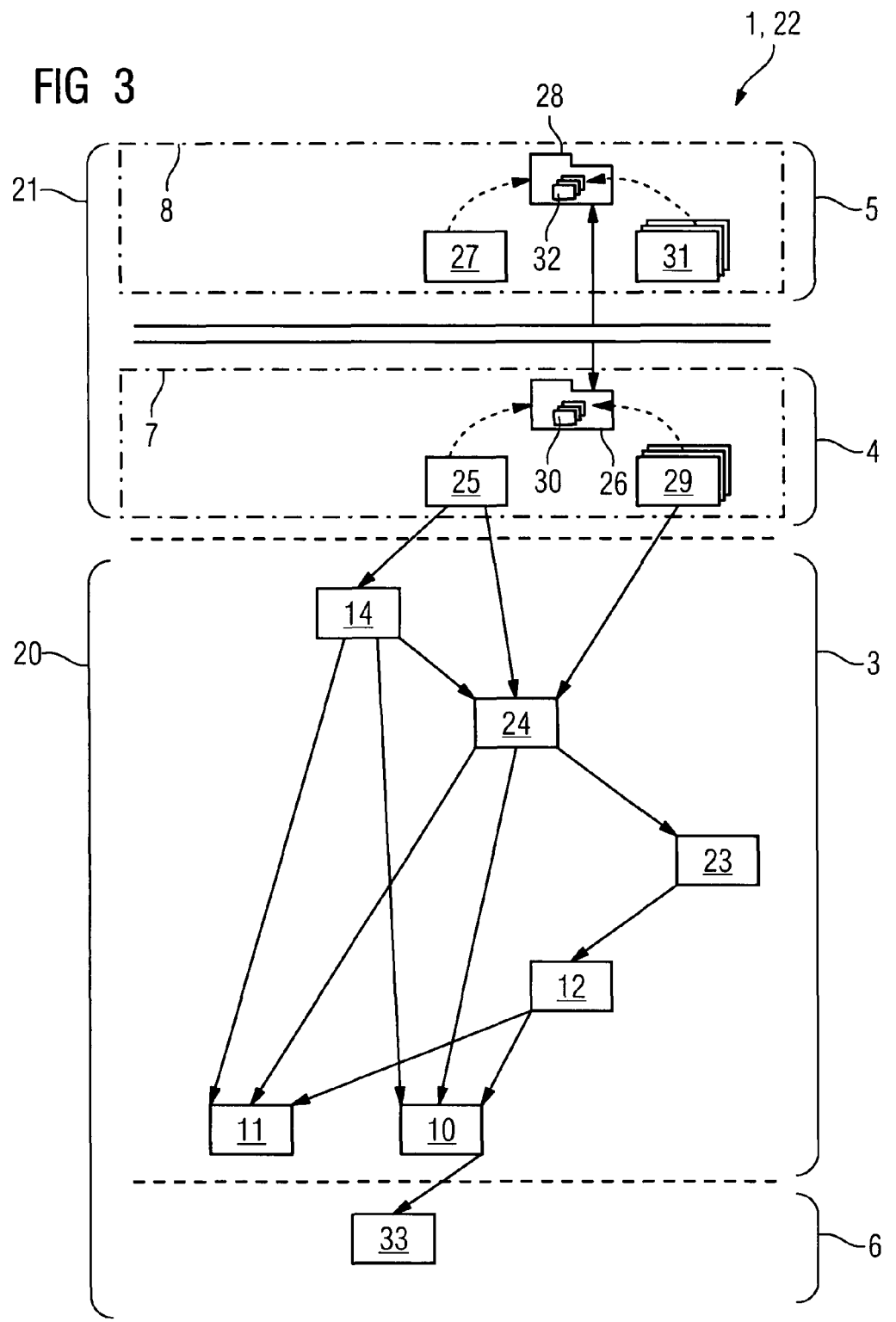
FIG. 3 shows in a representation according to FIG. 2 an alternative embodiment of the system having a transfer framework.

In the variant of the system 1 represented in FIG. 3, the latter comprises a framework oriented toward the subdomain of (data) transfer (TF) which is referred to below as the TF framework 22.

Analogously to the DM framework 2, in the service layer 3 the TF framework 22 comprises the file access module 10, the information model mapping module 11, the workspace module 12 and the standard DM access module 14. The TF framework 22 further comprises in the service layer 3 a pipeline module 23 and a TF service module 24, wherein the pipeline module 23 is superordinate to the workspace module 12 and accesses the latter. In turn the TF service module 24 is superordinate to the pipeline module 23 and accesses functions of the pipeline module 23, of the file access module 10 and of the information model mapping module 11. Within the TF framework 22, the standard DM access module 14 accesses functions of the file access module 10, of the information model mapping module 11, as well as—in deviation from FIG. 2—functions of the TF service module 24.

As components of the toolkit layer 4, the TF framework 22 comprises a TF basic module 25 which can be instantiated on an associated master page 26 of the programming environment 7. Within the presentation layer 5 a TF presentation module 27, which can be instantiated on a corresponding master page 28 of the programming environment 8, corresponds with the TF basic module 25.

As further components in the toolkit layer 4, the TF framework 22 comprises a number of TF toolbox modules 29, to each of which a content page 30 of the programming environment 7 which can be derived from the master page 26 can be assigned as individual content. Respective TF toolbox modules 31 of the presentation layer 5, to which corresponding content pages 32 of the programming environment 8 can be assigned, correspond with the TF toolbox modules 29.

The master pages 26, 28 and content pages 30, 32 exchange data with each other.

Starting from the TF basic module 25, direct access is possible to functions of the TF service module 24 as well as of the standard DM access module 14. Starting from the TF toolbox modules 29, access to the TF service module 24 is possible.

As a component of the web service layer 3, the TF framework 22 has remote TF services 33 that can be accessed from the file access module 10.

The components of the TF framework 22 again have in each case the or all functions respectively cited in the description section preceding the description of the figures.

Figure 4:
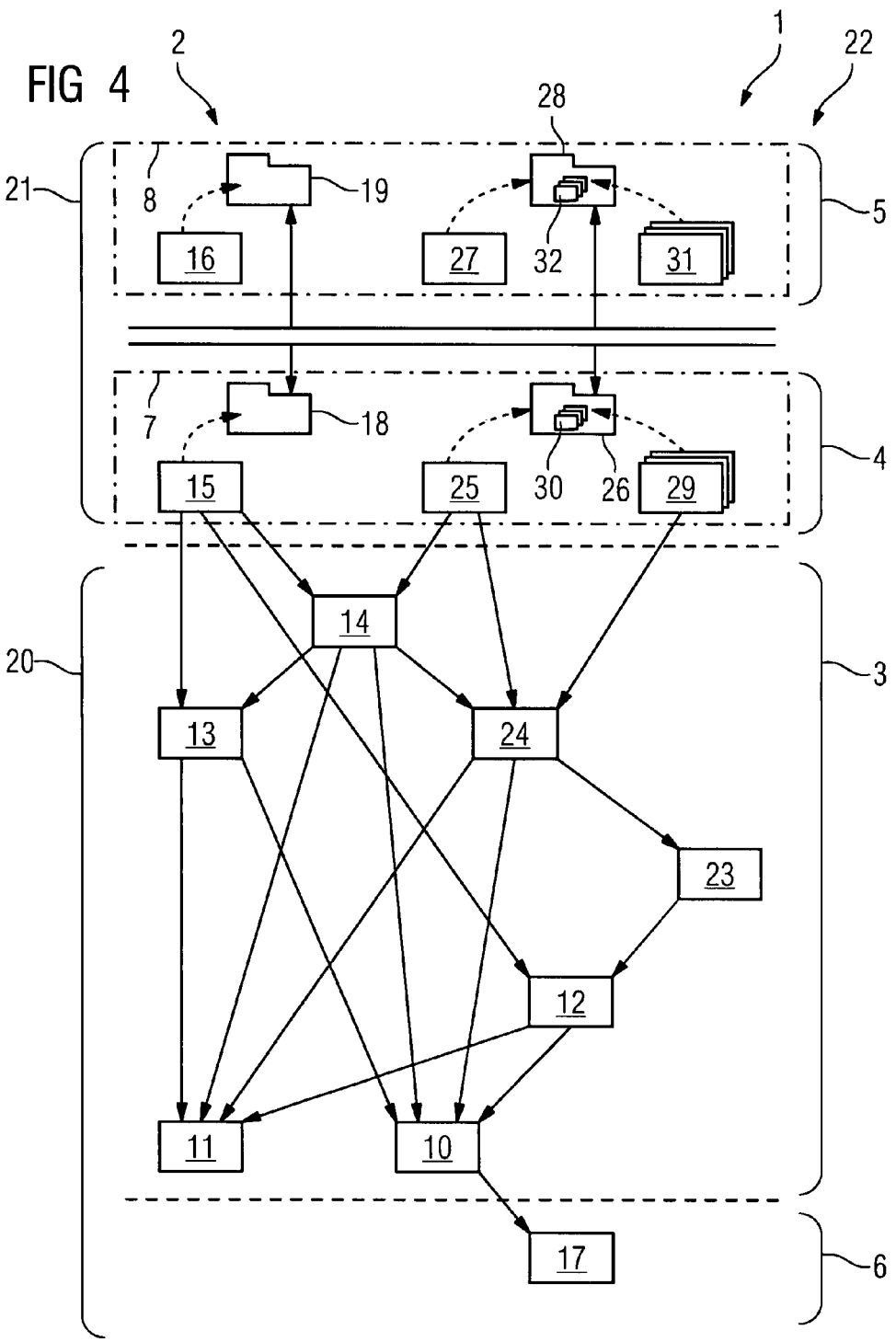
FIG. 4 shows in a representation according to FIG. 2 a further embodiment of the system which contains the data management framework according to FIG. 2 and the transfer framework according to FIG. 3 in combination.

In the variant of the system 1 represented in FIG. 4, said system has the DM framework 2 and the TF framework 22 in combination.

In this embodiment, starting from the standard DM access module 14, access is possible both to the DM service module 13 and to the TF service module 24, as well as additionally to the file access module 10 and the information model mapping module 11. In this embodiment the standard DM access module 14 in particular also has functions that enable combined access to functions of the service modules 13 and 24.

Figure 5:
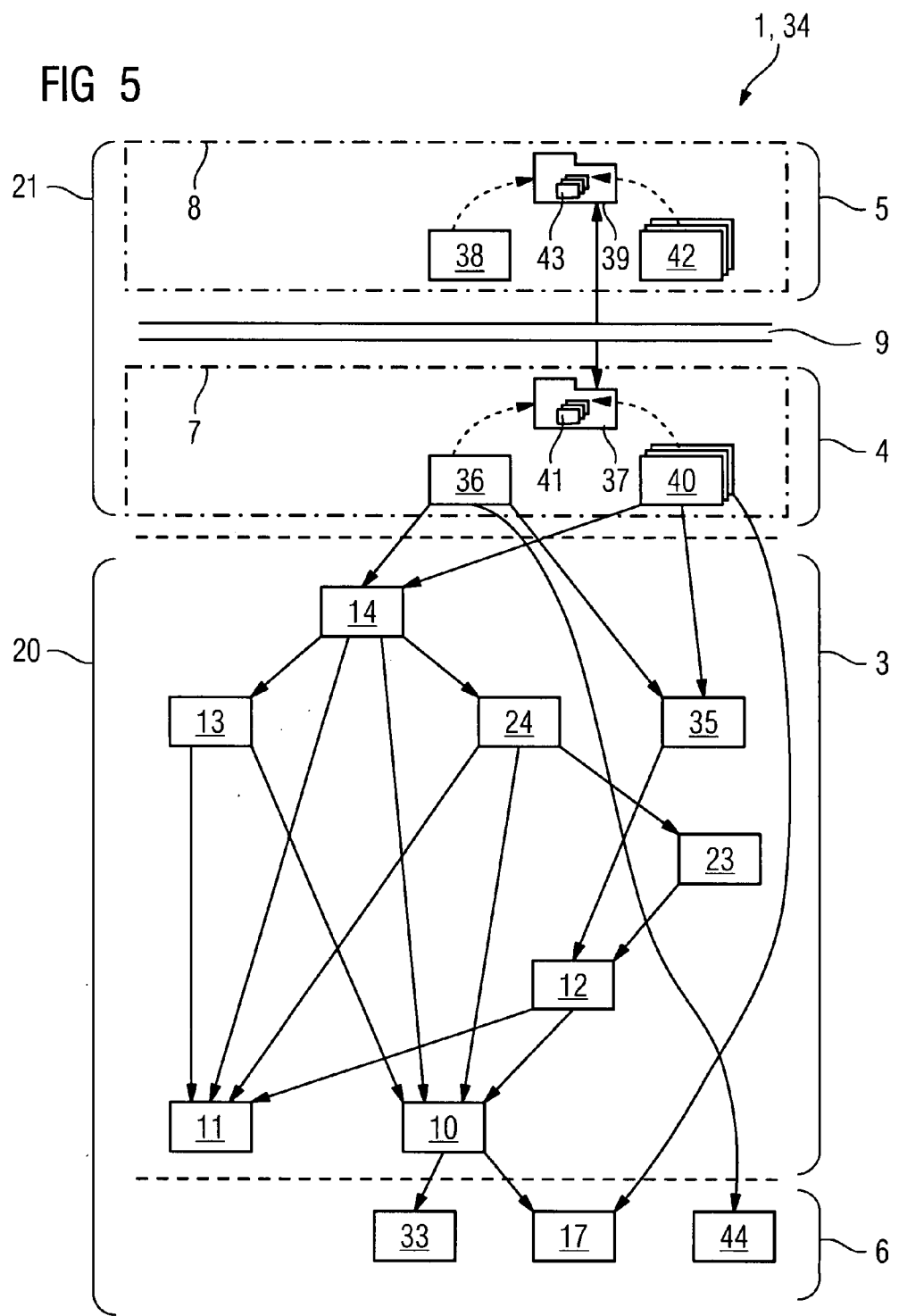
FIG. 5 shows in a representation according to FIG. 2 a further embodiment of the system having a worklist framework.

In the variant of the system 1 shown in FIG. 5, the latter comprises a framework designed for the subdomain of worklist management, referred to below as the WL framework 34 for short.

Analogously to the above variant of the system 1, the WL framework 34 comprises the service and web service components of the DM framework 2 and of the TF framework 22, namely the remote DM services 17 and the remote TF services 33, the file access module 10, the information model mapping module 11, the workspace module 12, the pipeline module 23, the DM service module 13, the TF service module 24 and the standard DM access module 14.

In addition to said components, in the service layer 3 the WL framework 34 comprises a WL service module 35 which is superordinate to the workspace module 12 and accesses its functionality.

In the toolkit layer 4, the WL framework 34 comprises a WL basic module 36 which can be instantiated in particular on a corresponding master page 37 of the programming environment 7. In the presentation layer 5, a WL presentation module 38, which in turn can be instantiated on a corresponding master page 39 of the programming environment 8, corresponds with the WL basic module 36.

On the one hand the WL basic module 36 accesses the WL service module 35 here. On the other hand, the WL basic module 36 accesses data management and transfer functionality via the standard DM access module 14.

As further components in the toolkit layer 4, the WL framework 34 optionally comprises a number of WL toolbox modules 40 which can be custom-generated and to each of which a content page 41 of the programming environment 7 which can be derived from the master page 37 can be assigned as individual content. Respective WL toolbox modules 42 of the presentation layer 5, to which corresponding content pages 43 of the programming environment 8 can be assigned, correspond with the WL toolbox modules 40. The WL toolbox modules 40 access here, for example, the WL service module 35, the standard DM access module 14 and the remote DM services 17.

The master pages 37, 39 and content pages 41, 43 exchange data with each other.

As a subdomain-specific component of the web service layer 6, the WL framework 34 comprises remote WL services 44 that can be accessed directly from the WL basic module 36.

The components of the WL framework 34 again have in each case the or all functions respectively cited in the description section preceding the description of the figures.

In the variant of the system 1 shown in FIG. 6, the latter comprises a framework designed for the subdomain of image processing, referred to below as the IP framework 45 for short.

Analogously to the above variant of the system 1, the IP framework 45 comprises the service and web service components of the DM framework 2 and of the TF framework 22, namely the remote DM services 17 and the remote TF services 33, as well as the file access module 10, the information model mapping module 11, the workspace module 12, the pipeline module 23, the DM service module 13, the TF service module 24 and the standard DM access module 14.

In addition to said components, in the service layer 3 the IP framework 45 comprises a segmenting module 46 subordinate to the pipeline module 23, a graphics/display module 47 coordinate with the pipeline module 23, and an IP service module 48 superordinate to the pipeline module 23. Both the pipeline module 23 and the graphics/display module 47 as well as the IP service module 48 access the segmenting module 46 here. Starting from the IP service module 48, in addition direct access is possible to the pipeline module 23, the graphics/display module 47 and the workspace module 12.

In the toolkit layer 4, the IP framework 45 comprises an image display basic module 49 which can be instantiated in particular on a corresponding master page 50 of the programming environment 7. In the presentation layer 5, an image display presentation module 51, which in turn can be instantiated on a corresponding master page 52 of the programming environment 8, corresponds with the IP basic module 49.

On the one hand the IP basic module 49 accesses the IP service module 48 here. On the other hand, the IP basic module 49 accesses data management and transfer functionality via the standard DM access module 14.

As further components in the toolkit layer 4, the IP framework 45 optionally comprises a number of image processing (IP) toolbox modules 53 which can be custom-generated and to each of which a content page 54 of the programming environment 7 which can be derived from the master page 50 can be assigned as individual content. Respective IP toolbox modules 55 of the presentation layer 5, to which corresponding content pages 56 of the programming environment 8 can be assigned, correspond with the IP toolbox modules 53. The IP toolbox modules 53 access the IP service module 48 here for example.

As a subdomain-specific component of the web service layer 6, the IP framework 45 comprises remote display services 57 that can be accessed from the graphics/display module 47.

The components of the IP framework 45 again have in each case the or all functions respectively cited in the description section preceding the description of the figures.

Figure 7:
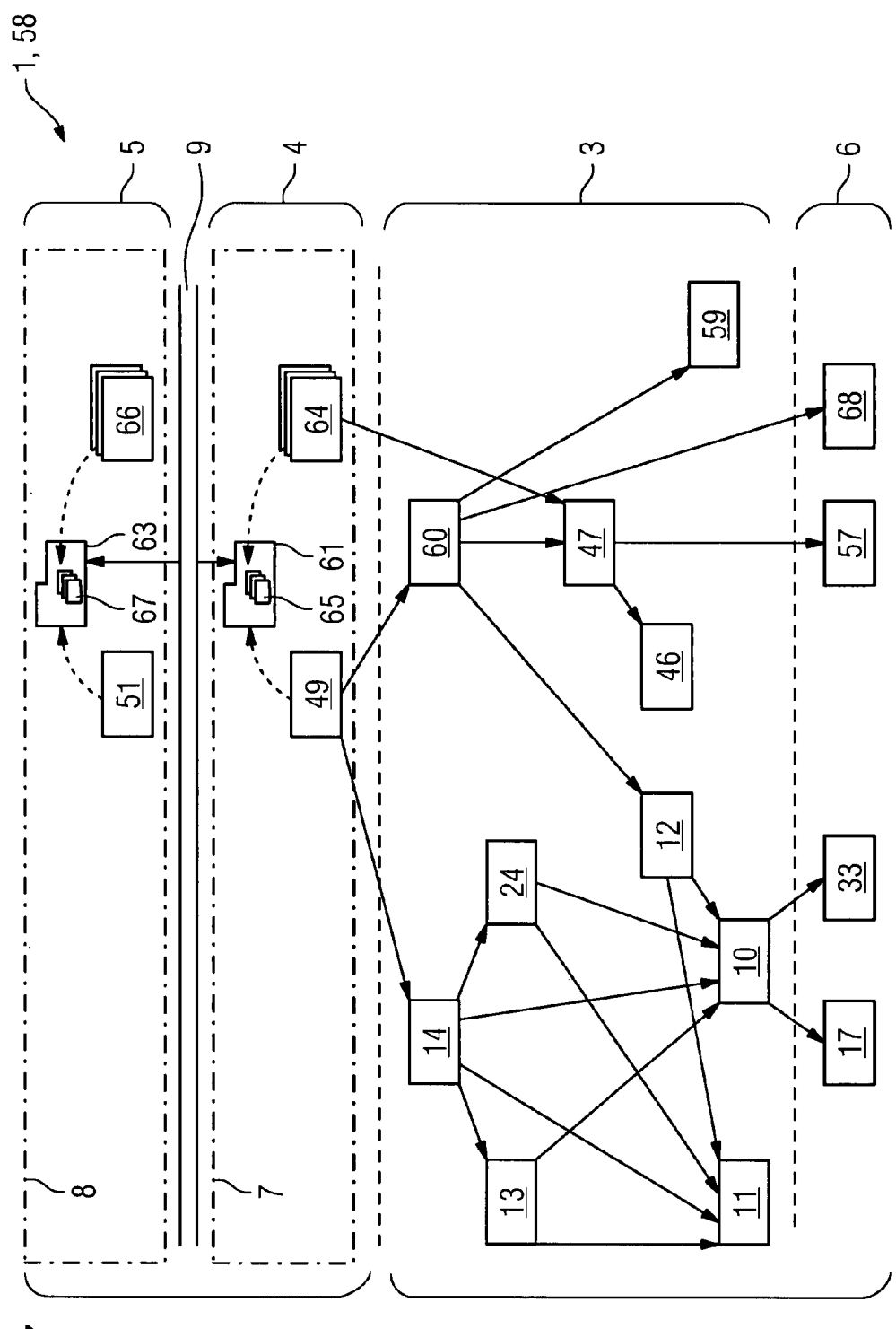
FIG. 7 shows in a representation according to FIG. 2 a further embodiment of the system having a volume processing framework.

In the variant of the system 1 shown in FIG. 7, the latter comprises a framework designed for the subdomain of volume processing, referred to below as the VOL framework 58 for short.

The VOL framework 58 comprises the service and web service components of the DM framework 2, as well as in part service and web service components of the TF framework 22 and of the IP framework 45, namely the remote DM services 17, the remote TF services 33 and remote display services 57, as well as the file access module 10, the information model mapping module 11, the workspace module 12, the DM service module 13, the TF service module 24 and the standard DM access module 14, the segmenting module 46 and the graphics/display module 47. In the embodiment of the system 1 according to FIG. 7, the pipeline module 23 provided within the TF framework 22 and IP framework 45 is not however present, since said component is specified for the modification of image data and is not required for the purpose of pure volume data processing. Within the VOL framework 58, for the purpose of graphically displaying the volume data, use is made of the specific service and web service components of the IP framework 45, namely the segmenting module 46 and the graphics/display module 47, since volume data can necessarily also be represented on a screen or printout in reduced two-dimensional form only, consequently in the form of image data.

In addition to the components mentioned, in the service layer 3 the VOL framework 58 comprises a 3D image synthesis module 59 and a VOL service module 60.

In the toolkit layer 4 as well, the VOL framework 58 co-utilizes with the image display basic module 49 a specific component of the IP framework 45. However, within the VOL framework 58 said image display basic module 49 can be instantiated on a separate master page 61 of the programming environment 7. Likewise, in the presentation layer 5 the VOL framework 58 comprises the corresponding image display presentation module 51, which in turn can be instantiated on a specific master page 63 of the programming environment 8 for the VOL framework 58.

Figure 6:
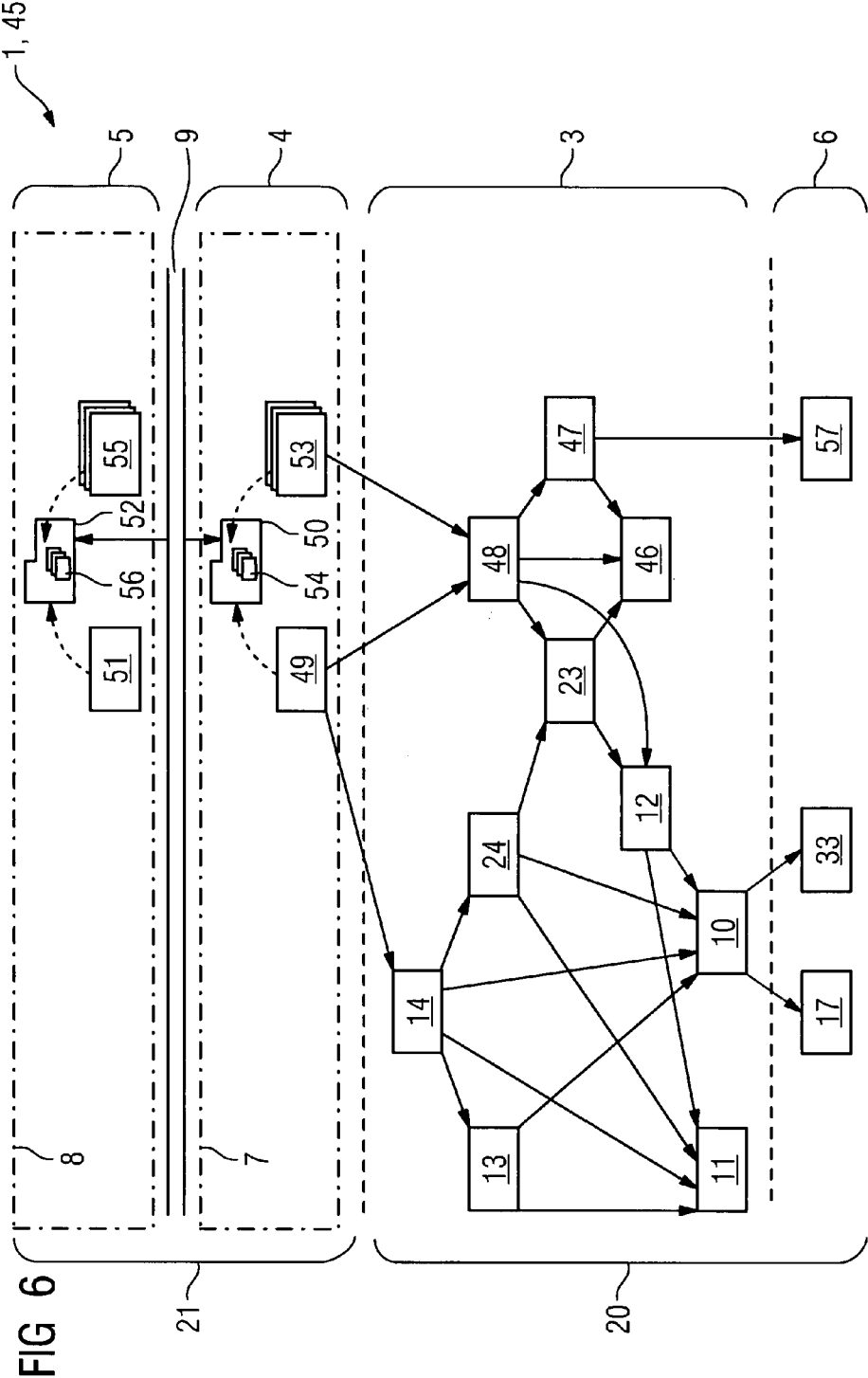
FIG. 6 shows in a representation according to FIG. 2 a further embodiment of the system having an image processing framework.

The image display basic module 49 accesses the standard DM access module 14 here as well as—in deviation from the embodiment according to FIG. 6—the VOL service module 60.

As further components in the toolkit layer 4, the VOL framework 58 optionally comprises a number of VOL toolbox modules 64 specifically for volume processing, to each of which a content page 65 of the programming environment 7 which can be derived from the master page 61 can be assigned as individual content. Respective VOL toolbox modules 66 of the presentation layer 5, to which corresponding content pages 67 of the programming environment 8 can be assigned, correspond with the VOL toolbox modules 64. The VOL toolbox modules 64 access the graphics/display module 47 here for example.

As a subdomain-specific component of the web service layer 6, the VOL framework 58 comprises remote VOL services 68 that can be accessed from the VOL service module 60.

The components of the VOL framework 58 again have in each case the or all functions respectively cited in the description section preceding the description of the figures.

Figure 8:
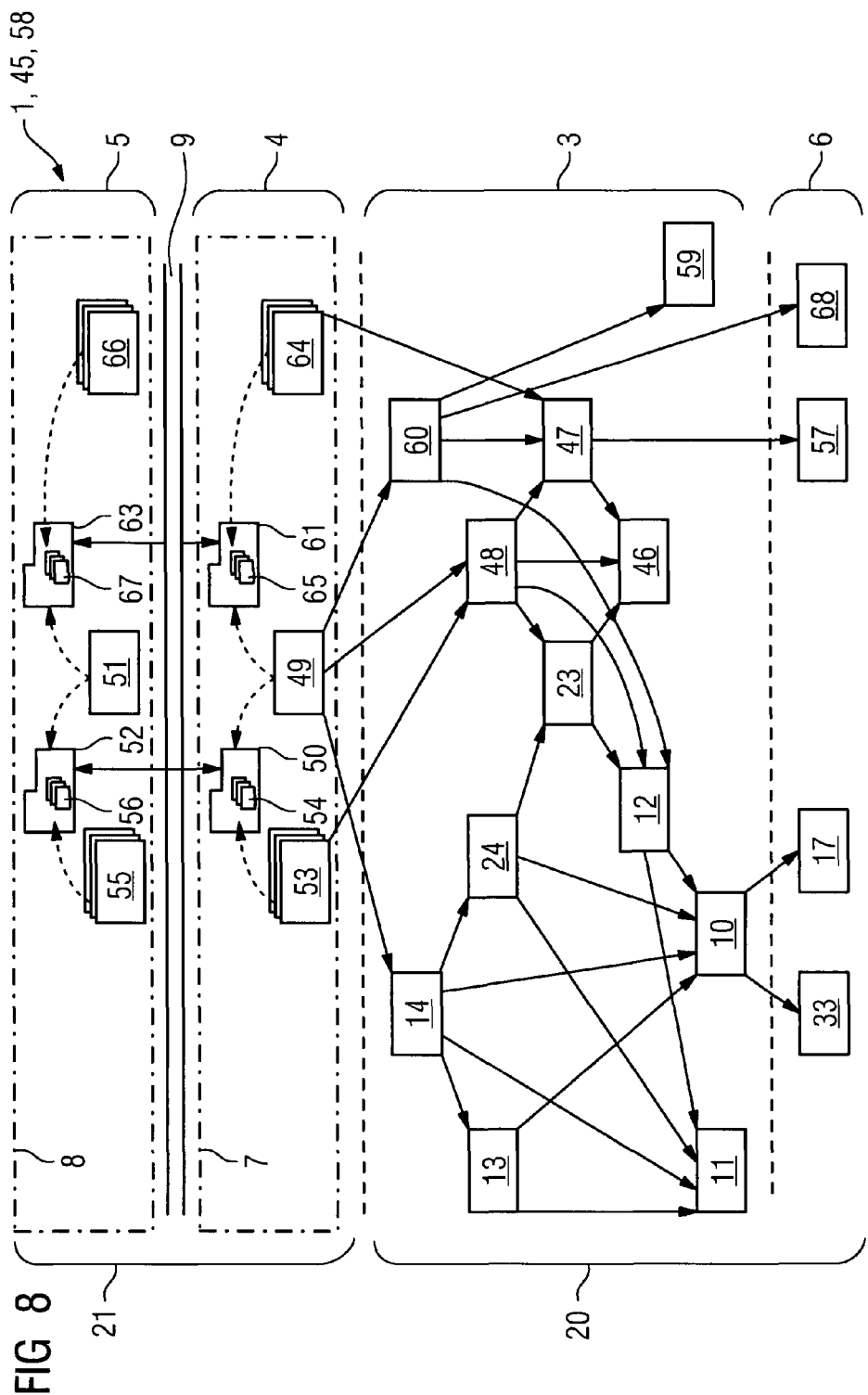
FIG. 8 shows in a representation according to FIG. 2 a further embodiment of the system which contains the image processing framework according to FIG. 6 and the volume processing framework according to FIG. 7 in combination.

Owing to the close content and structural links between the IP framework 45 and the VOL framework 58, the two frameworks are preferably used in combination with each other. A corresponding embodiment of the system 1 is represented in FIG. 8.

In this embodiment, the image display basic module 49 common to the two frameworks 45, 58 accesses the standard DM access module 14 as well as—in deviation from the embodiments described above—both the IP service module 48 and the VOL service module 60.

Figure 9:
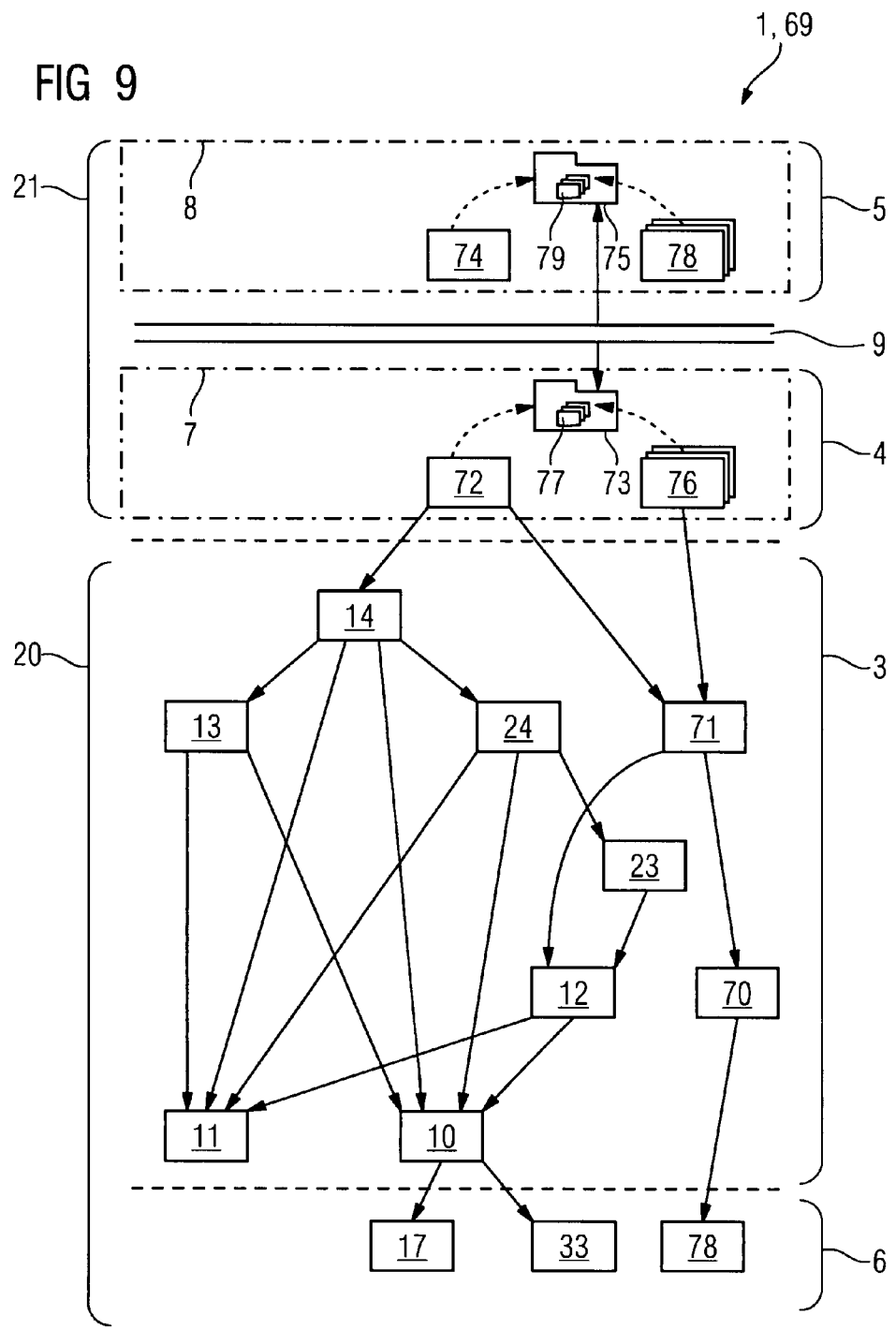
FIG. 9 shows in a representation according to FIG. 2 a further embodiment of the system having a reporting framework.

In the variant of the system 1 shown in FIG. 9, the latter comprises a framework designed for the subdomain of reporting, referred to below as the REP framework 69 for short.

The REP framework 69 also comprises the service and web service components of the DM framework 2 and of the TF framework 22, namely the remote DM services 17 and the remote TF services 33, as well as the file access module 10, the information model mapping module 11, the workspace module 12, the pipeline module 23, the DM service module 13, the TF service module 24 and the standard DM access module 14.

In addition to said components, in the service layer 3 the REP framework 69 comprises a terminology module 70 as well as an REP service module 71 which is superordinate to the latter and to the workspace module 12, and which accesses the functionality of the two first-mentioned modules 70 and 71.

In the toolkit layer 4, the REP framework 69 comprises an REP basic module 72 which can be instantiated in particular on a corresponding master page 73 of the programming environment 7. In the presentation layer 5, a REP presentation module 74, which in turn can be instantiated on a corresponding master page 75 of the programming environment 8, corresponds with the REP basic module 72.

On the one hand the REP basic module 72 accesses the REP service module 71 here. On the other hand, the REP basic module 72 accesses data management and transfer functionality via the standard DM access module 14.

As further components in the toolkit layer 4, the REP framework 69 optionally comprises a number of REP toolbox modules 76 which can be custom-generated and to each of which a content page 77 of the programming environment 7 which can be derived from the master page 73 can be assigned as individual content. Respective REP toolbox modules 78 of the presentation layer 5, to which corresponding content pages 79 of the programming environment 8 can be assigned, correspond with the REP toolbox modules 76. The REP toolbox modules 76 access the REP service module 71 here for example.

In the web service layer 6, the REP framework 69 additionally comprises a component referred to as the central terminology service 80, which the terminology module 70 accesses in online mode.

The components of the REP framework 69 again have in each case the or all functions respectively cited in the description section preceding the description of the figures.

Figure 10:
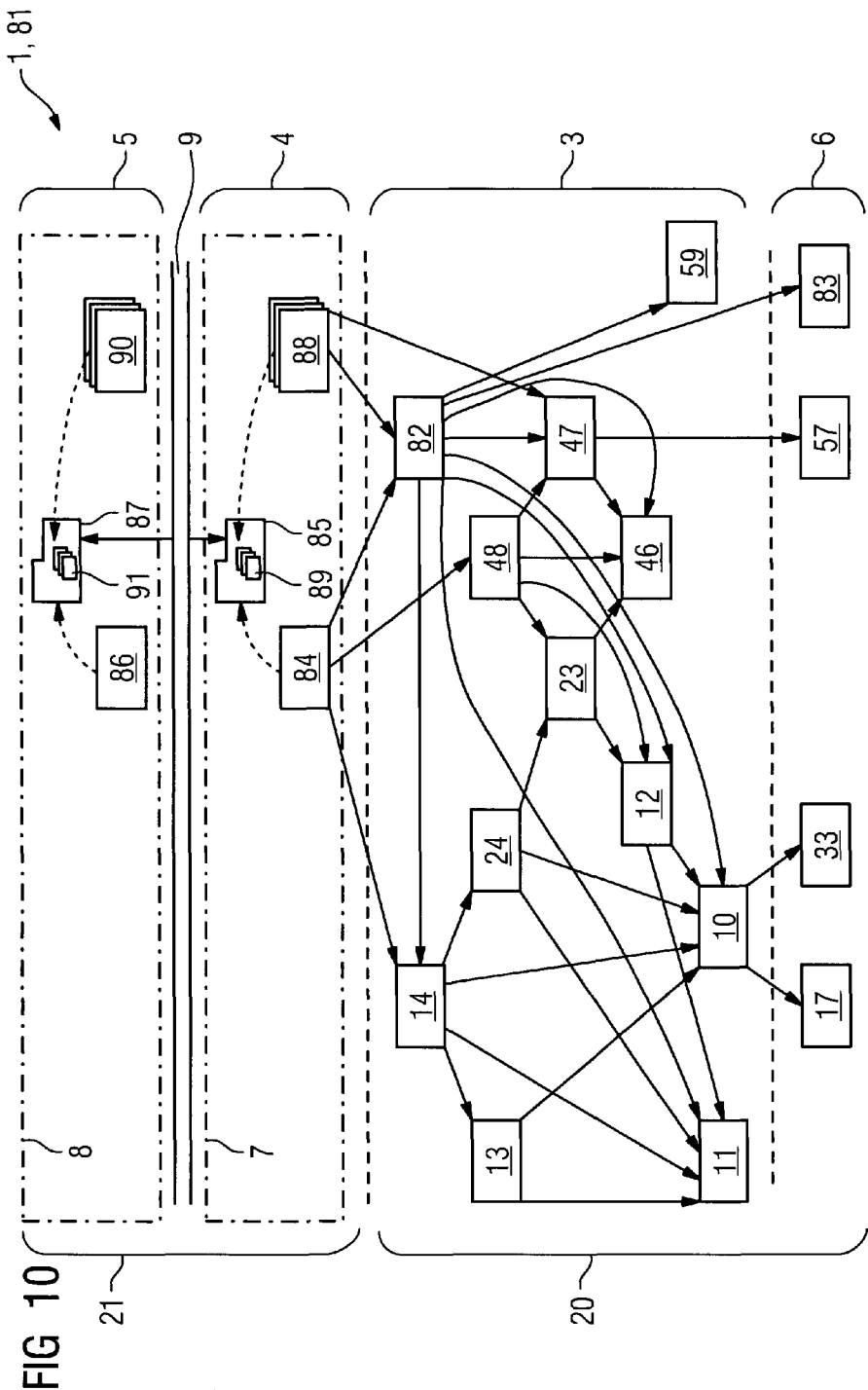
FIG. 10 shows in a representation according to FIG. 2 a further embodiment of the system having an image capture framework.

In the variant of the system 1 shown in FIG. 10, the latter comprises a framework designed for the subdomain of image capture (or examination), referred to below as the EXAM framework 81 for short.

The EXAM framework 81 comprises the service and web service components of the DM framework 2 and of the TF framework 22, namely the remote DM services 17 and the remote TF services 33, as well as the file access module 10, the information model mapping module 11, the workspace module 12, the pipeline module 23, the DM service module 13, the TF service module 24 and the standard DM access module 14.

The EXAM framework 81 further comprises the service and web service components of the IP framework 45, as well as parts of the VOL framework 58, namely the segmenting module 46, the graphics/display module 47 and the IP service module 48 as well as the remote display services 57 and the 3D image synthesis module 59.

The EXAM framework 81 further comprises an EXAM service module 82 in the service layer 3. Starting from the EXAM service module 82, direct access is possible to the file access module 10, the information model mapping module 11, the workspace module 12, the segmenting module 46, the graphics/display module 47 and the 3D image synthesis module 59. The EXAM service module 82 is also superordinate here to the standard DM access module 14 and accesses the latter.

As a subdomain-specific component of the web service layer 6, the EXAM framework 81 comprises remote EXAM services 83 that can likewise be accessed from the EXAM service module 82.

In the toolkit layer 4, the EXAM framework 81 comprises an EXAM basic module 84 which can be instantiated in particular on a corresponding master page 85 of the programming environment 7. In the presentation layer 5, an EXAM presentation module 86, which in turn can be instantiated on a corresponding master page 87 of the programming environment 8, corresponds with the EXAM basic module 84.

As further components in the toolkit layer 4, the EXAM framework 81 optionally comprises a number of EXAM toolbox modules 88 which can be custom-generated and to each of which a content page 89 of the programming environment 7 which can be derived from the master page 85 can be assigned as individual content. Respective EXAM toolbox modules 90 of the presentation layer 5, to which corresponding content pages 91 of the programming environment 8 can be assigned, correspond with the EXAM toolbox modules 88. The EXAM toolbox modules 88 access the EXAM service module 82 here for example.

The components of the EXAM framework 81 again have in each case the or all functions respectively cited in the description section preceding the description of the figures. In particular the functionality of the EXAM service module 82 comprises the above-mentioned subsystems, namely the image source control subsystem and the raw data adaptation subsystem.

The variant of the system 1 represented in FIG. 11 comprises in combination the DM framework 2, the TF framework 22, the WL framework 34, the IP framework 45, the VOL framework 58 and the REP framework 69, wherein each of the frameworks 2, 22, 34, 45, 58 and 69 is constructed in the way described above (the framework-specific toolbox modules, as well as the master and content pages of the programming environments 7 and 8 are not represented explicitly purely for the sake of clarity). A further variant of the system 1 (not represented in detail) additionally comprises the EXAM framework 81.

The invention claimed is:

1. A computer system with a framework for creating and running a software application for a medical imaging system, comprising:
a framework on a computer system that defines hierarchical layered structures for a plurality of components of the software application for a medical imaging system, wherein the plurality of components are configured hierarchically among themselves in a component hierarchy wherein an increasing degree of abstraction defines a higher ranking in a component's hierarchical order and wherein dependencies between the plurality of components are configured so that any component can only be accessed from a superordinate component and can only have access to a subordinate component, and wherein the framework comprises:
  (a) a first hierarchical layered structure that encapsulates individual layers of the software application, wherein the first hierarchical layered structure comprises:
    a service layer comprising a first plurality of components; and
    a toolkit layer superordinate in hierarchy to the service layer, wherein the toolkit layer comprises an application programming interface comprising a second plurality of components,
    wherein the first plurality of components of the service layer and the second plurality of components of the toolkit layer are configured to be arranged strictly hierarchically between layers and in accordance with the component hierarchy; and
  (b) a second hierarchical layered structure that encapsulates individual layers of the software application with respect to versioning requirements, wherein the second hierarchical layered structure comprises:
    a stability layer requiring components designated in that layer to remain functionally compatible with previous functionality upon versioning; and
    a development layer, superordinate in hierarchy to the stability layer, which does not require components designated in that layer to be compatible with previous functionality upon versioning,
    wherein each component of the service layer and the toolkit layer is assigned to either the stability layer or to the development layer and in accordance with the component hierarchy and wherein a boundary between the stability layer and the development layer is irrespective of a boundary between layers of the first hierarchical layered structure.

2. The system as claimed in claim 1, wherein the components of the service layer are single instantiated and multi-threaded and the components of the toolkit layer are multi-instantiated and single-threaded.

3. The system as claimed in claim 1, wherein the components of the toolkit layer are instantiated and linked in a visual programming environment assigned to the toolkit layer for a rapid application development.

4. The system as claimed in claim 1, wherein the first hierarchical layered structure of the framework further comprises a presentation layer comprising an assigned component for at least one component of the toolkit layer.

5. The system as claimed in claim 1, wherein the first hierarchical layered structure of the framework further comprises a web service layer that is subordinate to the service layer for running the system as a part of a medical network.

6. The system as claimed in claim 1, wherein a functionality of at least one component of the service layer is reversibly extended by plug-in.

7. The system as claimed in claim 1, wherein the boundary between the service layer and the toolkit layer is the same as the boundary between the stability layer and the development layer.

8. The system as claimed in claim 1, wherein the components of the framework are executed platform-independently in a runtime environment.

9. The system as claimed in claim 1, wherein the framework is selected from the group consisting of: a data management framework, a transfer framework, a worklist framework, an image processing framework, a volume processing framework, a reporting framework, and an image capture framework.

10. The system as claimed in claim 9, wherein the components of the service layer of the framework are selected from the group consisting of:
a file access module that reads data, writes data, deletes data, and creates a file in a file system,
an information model mapping module that is coordinate with the file access module for creating a unique reference to the file based on a metadata assigned to the file and for analyzing and grouping the reference, and
a workspace module that is superordinate to the file access module for platform-independent local caching of data.

11. The system as claimed in claim 10, wherein the service layer of the data management framework further comprises:
a data management service module that is superordinate to the file access module for data selection and file accessing control, and
a standard data management access module that is superordinate to the data management service module for simplified access to the data management service module, the file access module and the information model mapping module, and
wherein the toolkit layer of the data management framework comprises a data management basic module for accessing the data management service module.

12. The system as claimed in claim 11, wherein the data management service module comprises a subsystem with a function selected from the group consisting of: indexing a locally stored file according to a metadata assigned to the file, selecting the file by comparing the metadata with a given search string, synchronizing the file, avoiding multiple access to the file, controlling a user-specific access right to the file, and managing a work flag assigned to the file.

13. The system as claimed in claim 10, wherein the service layer of the transfer framework further comprises:
a pipeline module that defines a number of filters for processing an image data, and
a transfer service module that is superordinate to the file access module and to the pipeline module for transmitting data between two nodes of a medical network or two file systems, and
wherein the toolkit layer of the transfer framework comprises a transfer basic module for accessing the transfer service module.

14. The system as claimed in claim 10, wherein the service layer of the worklist framework further comprises a worklist service module that is superordinate to the workspace module for linking data to a worklist entry based on the workspace module, and
wherein the toolkit layer of the worklist framework comprises a worklist basic module for accessing the worklist service module.

15. The system as claimed in claim 10, wherein the service layer of the image processing framework further comprises:
- a segmenting module that segments a medical image data, and
- a graphics and display module that displays a layered image segment content, and
- wherein the toolkit layer of the image processing framework comprises an image display basic module for accessing the image processing service module.

16. The system as claimed in claim 10, wherein the service layer of the volume processing framework further comprises:
- a volume processing service module that processes and displays a medical volume data, and
- a 3D image synthesis module that creates a three-dimensional image, and
- wherein the toolkit layer of the volume processing framework comprises an image display basic module for accessing the volume processing service module.

17. The system as claimed in claim 10, wherein the service layer of the reporting framework further comprises:
- a reporting service module that is superordinate to the workspace module for creating and automatically reading a report,
- a terminology module that provides a boilerplate text for reporting, and
- wherein the toolkit layer of the reporting framework comprise a reporting basic module for accessing the reporting service module.

18. The system as claimed in claim 10, wherein the service layer of the image capture framework further comprises an image capture service module that captures raw data and edits the raw data, and
- wherein the toolkit layer of the image capture framework comprises an image capture basic module for accessing the image capture service module.

19. The system as claimed in claim 18, wherein the image capture service module comprises a subsystem for communicating with an image source or for adapting an image source specific raw data or an assigned metadata to a common data standard.

20. A computer-implemented method for creating and running a software application for a medical imaging computer system by a framework, comprising:
- defining hierarchies in a framework for a plurality of components of the software application for a medical imaging system, by configuring a component hierarchy for a plurality of components wherein an increasing degree of abstraction defines a higher ranking for a component's hierarchical order and wherein dependencies between the plurality of components are configured so that any component can only be accessed from a superordinate component and can only have access to a subordinate component;
- establishing in the framework a first hierarchical layered structure that encapsulates individual layers of the software application, wherein the first hierarchical layered structure comprises a service layer; and a toolkit layer superordinate in hierarchy to the service layer, wherein the toolkit layer comprises as an application programming interface;
- assigning a first plurality of components to the service layer; and
- assigning a second plurality of components to the toolkit layer,
- wherein the first plurality of components of the service layer and the second plurality of components of the toolkit layer are arranged strictly hierarchically between layers and in accordance with the component hierarchy;
- establishing in the framework a second hierarchical layered structure that encapsulates individual layers of the software application with respect to versioning requirements, wherein the second hierarchical layered structure comprises a stability layer requiring components designated in that layer to remain functionally compatible with previous functionality upon versioning; and a development layer, superordinate in hierarchy to the stability layer, which does not require components designated in that layer to be compatible with previous functionality upon versioning; and
- assigning components to either the stability layer or to the development layer and in accordance with the component hierarchy, wherein a boundary between the stability layer and the development layer is irrespective of a boundary between layers of the first hierarchical layered structure.

* * * * *